US006262730B1

(12) United States Patent
Horvitz et al.

(10) Patent No.: US 6,262,730 B1
(45) Date of Patent: Jul. 17, 2001

(54) INTELLIGENT USER ASSISTANCE FACILITY

(75) Inventors: Eric Horvitz, Kirkland; John S. Breese, Mercer Island; David E. Heckerman, Bellevue; Samuel D. Hobson, Seattle; David O. Hovel, Redmond; Adrian C. Klein, Seattle, all of WA (US); Jacobus A. Rommelse, Westerhoven (NL); Gregory L. Shaw, Kirkland, WA (US)

(73) Assignee: Microsoft Corp, Redmond, WA (US)

( * ) Notice: Subject to any disclaimer, the term of this patent is extended or adjusted under 35 U.S.C. 154(b) by 0 days.

(21) Appl. No.: 09/197,158

(22) Filed: Nov. 20, 1998

Related U.S. Application Data

(62) Division of application No. 08/684,003, filed on Jul. 19, 1996, now Pat. No. 6,021,403.

(51) Int. Cl.[7] ...................................................... G06F 3/00
(52) U.S. Cl. .............................................................. 345/337
(58) Field of Search ................................. 706/11, 12, 14, 706/45–47, 59–61; 345/337

(56) References Cited

U.S. PATENT DOCUMENTS

| | | | |
|---|---|---|---|
| 4,905,163 | * 2/1990 | Garber et al. | 706/55 |
| 5,239,617 | 8/1993 | Gardner et al. | 706/11 |
| 5,390,281 | 2/1995 | Luciw et al. | 706/11 |
| 5,546,502 | * 8/1996 | Hart et al. | 706/11 |
| 5,644,735 | 7/1997 | Luciw et al. | 395/338 |
| 5,689,619 | 11/1997 | Smyth | 706/45 |
| 5,694,559 | 12/1997 | Hobson et al. | 345/336 |
| 5,696,964 | 12/1997 | Cox et al. | 707/5 |
| 5,828,999 | 10/1998 | Bellegarda et al. | 704/240 |
| 5,850,627 | 12/1998 | Gould et al. | 704/231 |
| 5,920,477 | * 7/1999 | Hoffberg et al. | 382/181 |

FOREIGN PATENT DOCUMENTS

WO 92/0280  2/1992 (WO).

OTHER PUBLICATIONS

Hanks et al., "Modeling a Dynamic and Uncertain World I: Symbolic and Probabilistic Reasoning about Change," Technical Report 93–06–10, Dept. of Computer Science and Engineering, University of Washington, Jun. 15, 1993, pp. 1–42.*

Ngo et al., "A Theoretical Framework for Context–Sensitive Temporal Probability Model Construction with Application to Plan Projection," Proceedings of the Eleventh Conference on Uncertainty in Artificial Intelligence, Aug. 1995.*

Tawfik et al., "Irrelevance in Uncertain Temporal Reasoning," Proceedings of the Third International Workshop on Temporal Representation and Reasoning, 1996, pp. 196–202, May 1996.*

Lin et al., "How to Progress a Database (and Why): I. Logical Foundations," Proceedings of the Fourth International Conference on Principles of Knowledge Representation and Reasoning, 1994.*

(List continued on next page.)

Primary Examiner—Mark Powell
(74) Attorney, Agent, or Firm—Law Offices of Michael Dryja

(57) ABSTRACT

An intelligent user assistance system is disclosed. The system is constructed using a reasoning model to determine the probability of a user's intentions, goals, or informational needs in the context of a software program. This is accomplished through analysis of information about the user's actions, the program state, and spoken words. The system monitors user interaction with the software program and applies probabilistic reasoning to sense that the user may need assistance in using a particular feature or to accomplish a specific task. The inference system accesses a thorough and updateable user profile system to continually check for competencies and changes assistance that is given based on the competencies.

13 Claims, 31 Drawing Sheets

OTHER PUBLICATIONS

Nicholson et al., "Dynamic Belief Networks for Discrete Monitoring," IEEE Transactions on Systems, Man, and Cybernetics, vol. 24, No. 11, pp. 1593–1610, Nov. 1994.*
Kanazawa et al., "A Logic and Time Nets for Probabilistic Inference," Poceedings of the Ninth National Conference on Artificial Intelligence, 1991, vol. 1, pp. 360–365, Jul. 1991.*
Dean et al., "Persistence and Probabilistic Projection," IEEE Transactions on Systems, Man, and Cybernetics, vol. 19, No. 3, pp. 574–585, Jun. 1989.*
U.S. application No. 09/197,159, Horvitz, filed Nov. 20, 1998.
U.S. application No. 09/197,160, Horvitz, filed Nov. 20, 1998.
U.S. application No. 08/684,003, Horvitz, filed Jul. 19, 1996.
Kosba et al, "The User Modeling Shell System BGP–MS", *User Modeling and User–Adapted Interaction*, vol. 4, No. 2, pp. 59–106.
1995, Horvitz et al, "Display of Information for Time–Critical Decision Making", *In Proceedings of Eleventh Conference on Uncertainty in Artificial Intelligence*, Montreal, Aug. 5, 1995, 10 pages.
1995, Jameson et al, "Adaptive Provision of Evaluation–Oriented Information: Tasks an Techniques", *Depart. of Computer Science*, University of Saarbrucken, Proceedings of the Fourteenth International Joint Conference on Artificial Intelligence, pp. 1886–1893.
1995, Jameson, "Numerical Uncertainty Management in User and Student Modeling: An Overview of Systems and Issues", *Department of Computer Science*, University of Saarbrucken, pp. 1–48.
1994, Bauer et al, "Logic–based Plan Recognition for Intelligent Help Systems", *Current Trends in AI Planning*, IOS Press, 1994, pp. 60–73.
1993, Desmarais et al, "An Advice–Giving Interface Based on Plan–Recognition and User–Knowledge Assessment", *International Journal of Man–Machine Studies*, vol. 39, No. 6, pp. 901–924.
1990, Smith et al, "Intelligent Help—The Results of the EUROHELP Project", *ICL Technical Journal*, Nov. 7, 1990, No. 2, Oxford, Great Britain, pp. 328–361.
1985, Biswas et al, "An Active Assistance System for 'VI'", *IEEE 1985 Proceedings of the Internatioanl Conference on Cybernetics and Society*, Nov. 12–15, 1985, New York, New York, pp. 746–750.
1988, "Time–Dependent Unsolicited Help", *IBM Technical Disclosure Bulletin*, Aug. 1, 1988, vol. 31, No. 3, pp. 239.
1988, Cooper et al, "Conceptual Design of Goal Understanding Systems: Investigation of Temporal Reasoning Under Uncertainty", *Technical Memorandum NAS2–12381*, NASA–Ames Research Center, Mountain View, CA, Feb. 1988, pp. 1–42.
Press Release entitled "Microsoft Office 97 Released to Manufacturing," http://www.microsoft.com/PressPass/press/1996/Nov96/RTMPR.asp, dated Nov. 19, 1996 (indicating that Microsoft Office 97 released to manufacturing on Nov. 19, 1996, and is to be available at retail on Jan. 16, 1997).
Getting Results with Microsoft Office 97 Book, Copyright Page (indicating that book is "Copyrighted 1996 Office Getting Results Book," "Copyrighted 1997 Microsoft Corporation").

* cited by examiner

INTELLIGENT USER ASSISTANCE FACILITY

This application is a division of patent applicaton Ser. No 08/684,003 filed Jul. 19, 1996 now U.S. Pat. No. 6,021,403 and entitled "Intelligent User Assistance Facility".

TECHNICAL FIELD

This invention relates to expert systems in data processing. In particular, this invention relates to a system and method for automated machine reasoning to provide assistance to software users and to optimize the functionality of computer systems and software by performing inference about users needs and preferences in the operation of software systems or applications.

BACKGROUND OF THE INVENTION

Although significant advances in graphical user interfaces have made software applications more accessible and productive for personal computer users, the increased ease of use has fostered a demand to include more and more sophisticated features. When first exposed to a complicated software application, a new user can be confused by the overwhelming number and complexity of features accessible through the menus and toolbars of the user interface. It is not uncommon for a user unfamiliar with the software features to resort to menu surfing, rapidly switching from menu item to menu item, in the hope of discovering how to effect the desired feature. Even when users know one or more ways to perform a task in a software application, they may not realize an efficient approach. Also, user's may know how to perform tasks, yet instead of performing the task themselves, they would rather have a system proactively determine their needs and perform or offer to perform operations, such as launching applications that will soon be needed, exiting applications, and prefetching files or information from distant servers to make them available more efficiently when they are requested.

Determining in an automated manner the best actions to perform or the best information to provide users while they work with software requires the development of computational methods that operate in conjunction with software programs and that have the ability to identify a user's needs, intentions, or goals from aspects of a user's background and actions. Such methods may be derived from the construction and use of models that explicitly links the users' needs to their backgrounds and actions.

There have been several studies of the use of models for reasoning about the intentions of people performing a variety of tasks, and for making available advice or assistance based on these models. Researchers studying the use of computers in education have attempted to construct programs that use models of users to determine the source of misunderstanding and the best way to tutor a student. These models can look at the answers users give to questions and other challenges. The Strategic Computing Initiative of the 1980s focused in part on methods for doing reasoning about a pilot's intentions from a diverse set of inputs, and for providing them with the best assistance with piloting and warfighting with fighter jets. Within the many such "pilot associates" projects, engineers attempted to design systems that could reason about the intentions of users. Typically, rule-based or logical approaches were used for determining or prioritizing options.

There has also been some work in the use of probabilistic models in the modeling of user's needs for such tasks as monitoring complex, time-critical applications. Some of the earliest discussion of probabilistic dependency models, with applications to enhancing the display of information, were in projects experimenting with the modeling of users for controlling the information displayed to aircraft pilots. Probabilistic inference was explored as a means for controlling the information being displayed to pilots. Other work included using decision-theoretic methods to reason about the most important information to display to flight engineers at NASA Mission Control Center. The methods consider context, user expertise level, and telemetry from the Space Shuttle to make these decisions, and take advantage of time-criticality and probabilistic models of user beliefs and intentions. Other related work has explored the best kind of information and explanations to display to pilots given various tradeoffs in display. In other work, researchers have explored the use of probabilistic models in assisting computer users working with command line input systems of a computer operating system.

There have been several projects focusing on the use of sets of logical rules and heuristics based on logical rules for providing users with assistance based on the context and activity. For instance, the common context-sensitive help that is made available in applications written for the MICROSOFT WINDOWS operating system is accessed by selecting a graphical object and clicking a standard help command (e.g., a function key on the keyboard). Help information is then provided which describes the fuictionality of the graphical object such a toolbar. Another example is the TipWizard system in MICROSOFT EXCEL spreadsheet products which employs a large set of logical rules that continue to scan for sequences of user events and provide assistance to users on performing tasks more efficiently. In work described by U.S. Pat. No. 5,390,281 to Luciw et al., sets of rules are used for providing assistance to users on tasks by employing the heuristic of comparing the number of conditions for a rule to fire with the specific number of conditions that are seen in a particular situation and for interpreting this fraction as a strength associated with the action indicated by the rule.

There has also been work on more sophisticated probabilistic models that consider the uncertainty in user goals and needs for software assistance. The Answer Wizard feature of MICROSOFT OFFICE application products on the use of probabilistic models for interpreting the words in a user's free-text query with a focus on assisting users with using computer software applications. In this work, the uncertain relationship between sets of related words that might be seen in a query and various kinds of assistance are modeled with probability. This work has been described in U.S. patent application Ser. No. 08400797.

However, none of these former efforts have employed sophisticated methods for reasoning under uncertainty about a user's needs for assistance by considering multiple pieces of evidence, including information about a user's background and a user's activities that are autonomously sensed by the program, and, then, have offered to provide relevant assistance to a user based on this reasoning. Nor have these systems considered monitoring user interaction with a software program so that, when a user does inquire about help directly with free-text queries, the system combines the analysis of the words in the free-text query with the ongoing analysis of user actions and program context.

What is desirable is an intelligent user assistance facility that autonomously senses that the user may need assistance in using a particular feature or to accomplish a specific task, and that offers to provide relevant assistance based upon considering multiple pieces of evidence, including information about a user's background and a user's activities. What is also desirable is an intelligent user assistance facility that combines the analysis of the words in the free-text query with the ongoing analysis of user actions and program context whenever a user asks directly for help with free-text queries. This invention solves the problem of autonomously sensing that a user may need assistance in using a particular feature or to accomplish a specific task, and offering to provide relevant assistance based upon considering multiple pieces of evidence, including information about a user's background and a user's activities. This invention also solves the problem of combining the analysis of the words in the free-text query with the ongoing analysis of user actions and program context whenever a user asks directly for help with free-text queries. In addition, the invention is able to monitor and perform inference about several classes of events, including the state of key data structures in a program, general sequences of user inputs with a mouse-controlled cursor in the normal course of interacting with a graphical user interface, words typed in free-text queries for assistance, visual information about users, such as gaze and gesture information, and speech information.

SUMMARY OF INVENTION

The present invention provides a method of building an intelligent user assistance facility for a software program to assist a user in operation of the software program. Functionality of the software program is identified for providing intelligent user assistance. A reasoning model is constructed for the identified program functionality for the task of providing intelligent user assistance. The reasoning model computes the probability of alternative user's intentions, goals, or informational needs through analysis of information about a user's actions, program state, and words. Modeled events for the identified program functionality are defined for use by the reasoning model to provide intelligent user assistance. Atomic user interface interactions are identified that signify the occurrence of modeled events.

The present invention also includes a general event composing and monitoring system that allows high-level events to be created from combinations of low-level events. The event system, in combination with a reasoning system, is able to monitor and perform inference about several classes of events for a variety of purposes. The various classes of events include the state of key data structures in a program, general sequences of user inputs with a mouse-controlled cursor in the normal course of interacting with a graphical user interface, words typed in free-text queries for assistance, visual information about users, such as gaze and gesture information, and speech information. The present invention additionally provides a system and method to monitor user interaction with a software program and to apply probabilistic reasoning to sense that the user may need assistance in using a particular feature or to accomplish a specific task. The system continues to examine a user's actions and, from this information, generates probabilities about user needs and goals.

In an exemplary embodiment, the likelihoods that various text-based help topics or demonstrations of various software tasks are relevant are computed and the assistance is made available to users. Probabilities are computed about relevant help topics as well as about the probability that a user would desire help. In this embodiment, the invention computes the probabilities that a user needs alternate forms of help, and uses this information to prioritize a list of help topics, when help is requested. When help has not been requested, the system uses its inference to determine when a user might desire assistance, and comes forward autonomously, depending on the computed importance of coming forward and the level at which a user sets a threshold. Whenever a user asks directly for help with free-text queries, this embodiment combines the analysis of the words in the free-text query with the ongoing analysis of user actions and program context.

The invention includes a rich, updatable user profiling system. In the help-topic embodiment, the inference system accesses the user profile system to continually check for competencies and changes assistance that is given based on user competence.

The present invention also includes a novel inference system with an annotated Bayesian network to include special temporal reasoning procedures. Temporal reasoning mechanisms are used to consider the changes in relevance of events with current needs and goals of users with time passing after an event has occurred. The inference engine includes a new specific approximation procedure which uses a single explicit Bayesian network knowledge base, but changes the likelihood information in the network based on the distance in the past that an observation was made.

The system also allows users to control the thresholds that must be reached before users are offered assistance, allowing them to tailor the system's behavior to their own personal preference about being distracted with assistance. Finally, the methods have been integrated with multiple graphical user interfaces, including a social-user interface in the form of an animated character.

DETAILED DESCRIPTION OF THE INVENTION

Figure 1:
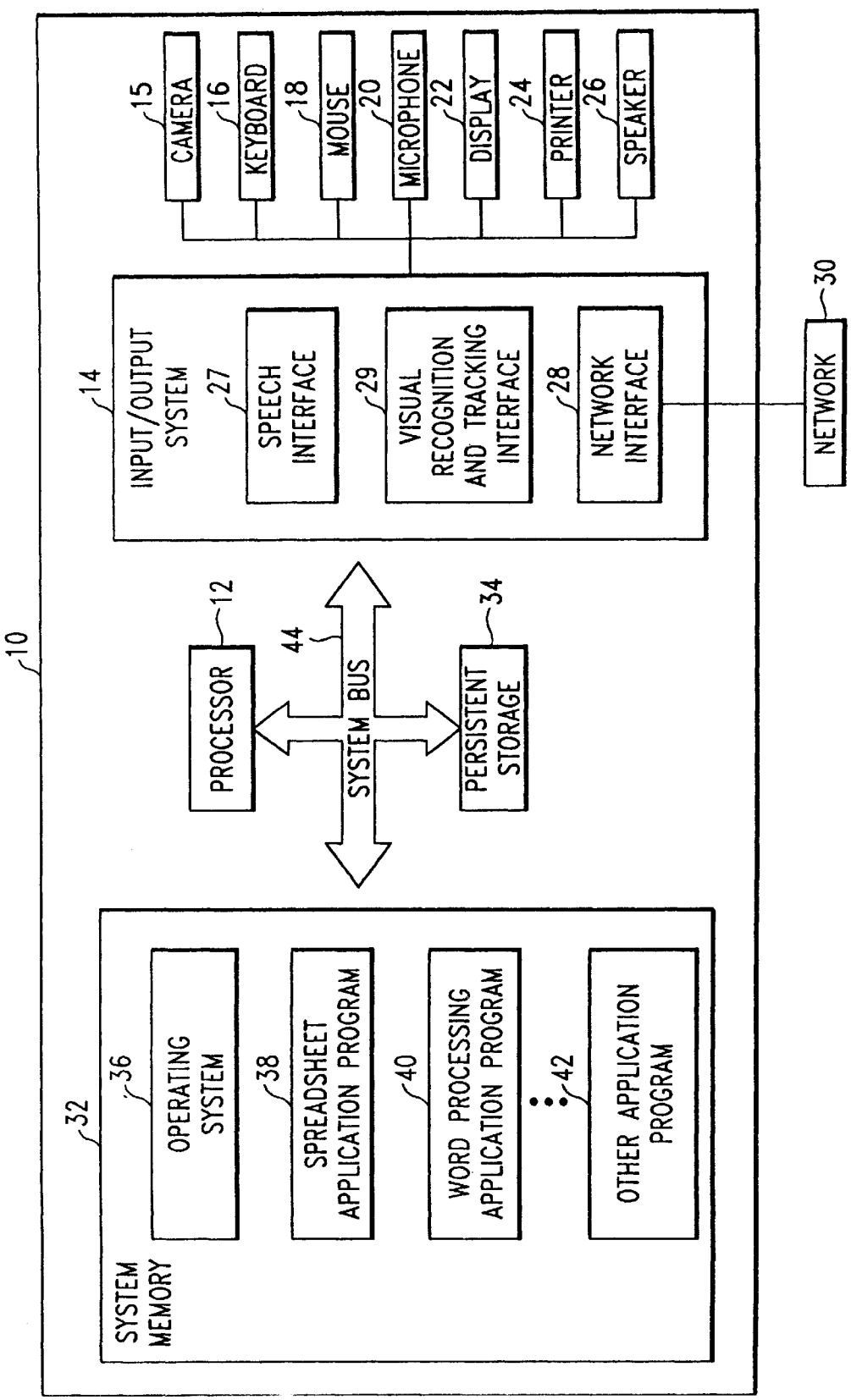
FIG. 1 is a block diagram of a computer system.

The present invention provides a general event composing and monitoring system that allows high-level events to be created from combinations of low-level events. The event system, in combination with a reasoning system, is able to monitor and perform inference about several classes of events for a variety of purposes. The various classes of events include the state of key data structures in a program, general sequences of user inputs with a mouse-controlled cursor in the normal course of interacting with a graphical user interface, words typed in free-text queries for assistance, visual information about users, such as gaze and gesture information, and speech information. The present invention also employs a novel event specification tool that allows for rapid development of a general event processor that creates high-level events from combinations of user actions.

The present invention also includes a novel inference system with an annotated Bayesian network to include special temporal reasoning procedures. The inference engine includes a new specific approximation procedure which uses a single explicit Bayesian network knowledge base, but changes the likelihood information in the network based on the distance in the past that an observation was made. The knowledge base includes special annotations with temporal dynamics information and the inference engine includes special procedures to handle changes in relevance with the passing of time.

The present invention also provides an intelligent user assistance facility and method for use of probabilistic and logical reasoning to make decisions about the best way to provide assistance to a computer software user. The present invention additionally provides a method of building an intelligent user assistance facility by constructing a reasoning model to compute the probability of a user's intentions, goals, or informational needs through analysis of information about a user's actions, program state, and words. An exemplary embodiment of the present invention monitors user interaction with a software application and applies probabilistic reasoning to sense that the user may need assistance in using a particular feature or to accomplish a specific task. This embodiment of the present invention additionally accepts a free-text query from the user asking for help and combines the inference analysis of user actions and program state with an inference analysis of the free-text query. This embodiment of the present invention also incorporates a novel user profile system that stores information about the competence of users that may be established initially by user input or dialogue with the user and that is updated with the results of ongoing user activity. This persistent user profile provides user competency information during inference analysis and further enables customization of tutorial information for the user after an application session concludes.

Furthermore, this embodiment includes automated assistance reasoning to determine when a user might want help, and comes forward autonomously, depending on the computed importance of coming forward and the level at which a user sets a threshold. When a user does inquire about help directly with free-text queries, the system also combines the analysis of the words in the free-text query with the ongoing analysis of user actions.

FIG. 1 is a block diagram of a computer system 10 that is suitable for practicing an exemplary embodiment of the present invention. Those skilled in the art will appreciate that the computer of system 10 depicted in FIG. 1 is intended to be merely illustrative and that the present invention may be practiced with other computer system configurations, including distributed systems and multiprocessor systems, and handheld devices. The computer system 10 includes a processor 12 and an input/output system 14. The input devices may be, for example, a camera 15, a keyboard 16, a mouse 18, a microphone 20, a pointing device or other input device. The output devices may be, for example, a display screen 22, a printer 24, a speaker 26 or other output device. The computer system 10 may include a speech interface 27 that interfaces a speech system with the microphone 20 and speaker 26. The computer system 10 may include a visual recognition and tracking interface 29 that interfaces a visual recognition and tracking system with the camera 15 or other specialized head gear with an infrared reflector or 3D ultrasound sensors. The computer system 10 may also include a network interface 28 that interfaces the computer with a network 30 that may be either a local area network or a wide area network such as the Internet. The computer system additionally includes a system memory 32 and persistent storage 34 that contain application programs and the intelligent user assistance facility. The persistent storage may be a diskette, CDROM, hard-drive, or firmware. The computer system 10 includes an operating system 36 and several application programs such as a spreadsheet application program 38, a word processing application program 40, or other application program 42. A system bus 44 interconnects the processor 12, system memory 32, persistent storage 34, and input/output system 14. Those skilled in the art will appreciate that the intelligent user assistance facility may be integrated directly into the application programs or may be a stand alone facility that is part of a system library or operating system.

Overview of the Intelligent User Assistance Facility (IUAF)

Although software usability studies can pinpoint user interface problems for accessing complex features and can simplify and make the user interface more intuitive for accessing the features, improvements to the user interface cannot hide the multitude of complex features or simplify the functionality of a complex feature for the inexperienced user without reducing the number of features exposed through the interface and/or exposing only simplified versions of the full feature.

One by-product of software program usability studies can be the identification of user behavior when a user experiences difficulties in using basic functionality of a particular software program. This invention provides a process for making an intelligent user assistance facility for a particular software program by observing and understanding user behavior when a user experiences such difficulties or when a user might benefit by providing automated actions.

Figure 2:
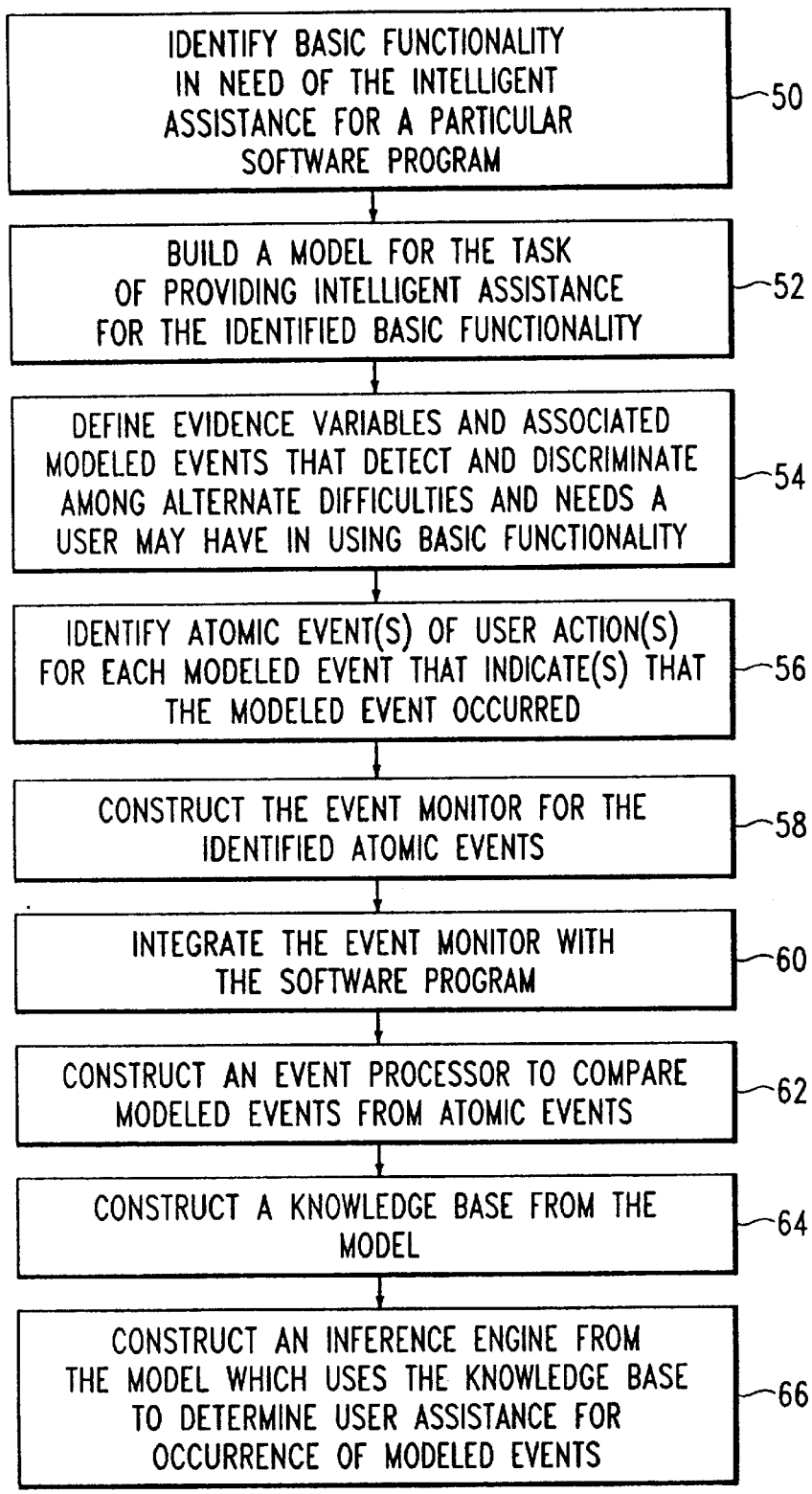
FIG. 2 is a flowchart for building an intelligent user assistance facility for a software program.

FIG. 2 is a flowchart of the method for making an intelligent user assistance facility for a software program. The first step 50 of the process is to identify the basic functionality of a particular software program in which users experience difficulties, or could benefit from automated assistance, and the user behavior exhibited by the user when the user is experiencing those difficulties or desire for assistance. One way of accomplishing this step is to observe and record user behavior when a user experiences difficulties during usability studies for that particular software program. For example, during a usability study for a spreadsheet program, a user interacting with a spreadsheet may be asked to update a graphical chart (e.g., a bar chart) of data on a spreadsheet. The user may have no experience in changing or modifying bar charts once they have been created. The user subsequently exhibits the following behavior: First the user selects the bar chart by placing the mouse pointer on the chart and double clicking the mouse button. Then the user pauses to dwell on the chart for some period of time while introspecting or searching for the next step. Observation of this activity could serve as an indication that the user is experiencing difficulty in using the chart feature of the spreadsheet.

Once the difficulties with using basic functionality are identified, the next step 52 is to build a model for the task of providing intelligent assistance for the basic functionality identified. One type of model is an network of interdependent variables such as a Bayesian network that can represent probabilistic relationships between observable evidence, intermediate variables, and hypotheses of interest. A Bayesian network is a directed acyclic graph in which the nodes represent random variables and arcs between nodes represent probabilistic dependencies among those variables. A Bayesian network represents a joint-probability distribution for a set of variables. Computational procedures, referred to as Bayesian inference algorithms have been developed to operate on Bavesian networks. These algorithms update the probability distributions over states of variables in a Bayesian network given changes that are made in values of states. An example of state changes are new values assigned to states of variables representing observable states of the world, following the observation of these states in the world.

A description of Bayesian networks can be found in "Probabilistic Reasoning In Intelligent Systems", by Judea Pearl, 1Morgan Kaufinann Publishing Inc., San Mateo, 1988.

Figure 3:
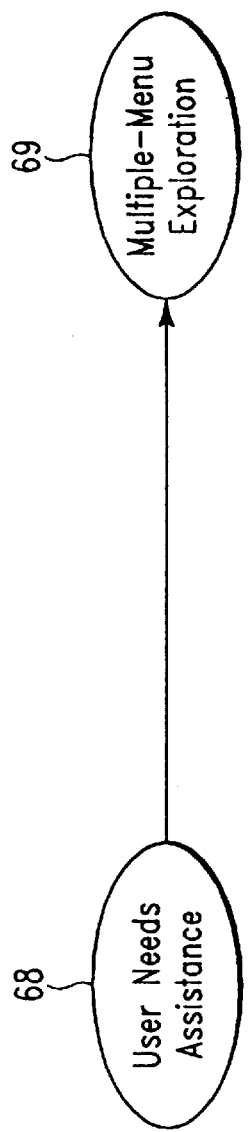
FIG. 3 is a diagram illustrating a simple two variable Bayesian network.

Some of the nodes are variables that represent evidence that may be observed. Other nodes represent unobservable or difficult to observe hypotheses of interest that may be used in automated decision making. A simple two-variable Bayesian network is displayed in FIG. 3. The network represents the dependency between a user being in a state of needing assistance 68 and the user activity of multiple menu exploration 69 or "menu surfing" without making progress. Menu surfing can be sensed, but it cannot be easily observed whether a user needs assistance. In modeling user difficulties with complex software features, evidence nodes may represent user behavior exhibited while performing actions toward certain goals or experiencing difficulty with a software program feature, and hypothesis nodes may represent the goals of the user or the particular assistance needed by the user to complete a task using that feature. For example, while creating a chart the user pauses after selecting the create chart command. An evidence node variable would represent the fact that the user paused after selecting a command. An hypothesis node variable may represent the probability of the hypothesis that the user needs assistance in creating a chart given the fact that the user paused after selecting the create chart command. Using a Bayesian network is one way of building such a model of uncertain relationships between user actions and hypotheses. Those skilled in the art will recognize that other models can be used such as decision trees or rule-based reasoning.

For any of these models, the next step 54 is to define evidence variables and corresponding modeled events that can discriminate among alternate difficulties and needs for assistance that a person may have in using the basic functionality of the software program, and that can be sensed during the user's interaction with software. A key task required in building the Bayesian network model for the intelligent assistance facility is defining the evidence variables that will be observed, and noting the probabilistic relationships of these variables to variables representing hypotheses of interest. These events are those that are useful in detecting and discriminating among alternate difficulties and needs a person may have in using complex software features in general and, in particular, specific complex software features of a software application.

Classes of observation that are valuable for identifying when and what kind of assistance users need include evidence of search (e.g., exploration of multiple menus), of introspection, (e.g., sudden pause or slowing of command stream), of focus of attention (e.g., selecting and pausing on objects), of undesired effects of action (e.g., command/undo, dialogue opened and canceled without action), of inefficient command sequences, the structural and semantic content of file being worked on, and goal-specific sequences of actions. Also, program state and program context, user competencies, and the history of information reviewed by the user are useful.

In developing the Bayesian network and specifying these observable variable;, it is important to consider the nature and definition of the intelligent user assistance facility which will be harnessed to detect user actions. Consideration must be given to the basic events that can be made available from the software system or application. Modeled events detected as occurring by the system are designed to correspond with each observable variable. The modeled events must be defined in terms of the basic, or atomic events that are generated by the software program.

At run-time, the modeled events corresponding to the observable evidence variables that are modeled in the Bayesian network are provided to the inference system which sets the evidence variables to specific values. The intelligent user assistance facility has the ability to consider the recent occurrence of multiple modeled events in parallel and to consider the time these events occurred, and to use this monitored information to update the state of observed variables in the Bayesian network. The Bayesian network with its associated dynamically changing settings with regard to the status and timing of observed variables is analyzed in the inference system which generates updated likelihoods on different hypotheses of interest. These probabilities are used in making decisions about action and display of information to users.

Upon completing the task of defining evidence variables in a Bayesian network and their associated modeled events, the next step 56 is to identify atomic events that indicate the occurrence of each modeled event. Modeled events can be defined by the occurrence of a single atomic event, associated with a user action or state of the program or may represent a sequence of one or more atomic events. For example, the two atomic events of (1) a user selecting a bar chart and then (2) pausing to dwell on the chart for more than 10 seconds can be composed into a single modeled event that corresponds to an evidence variable in a Bayesian network. Both of these events may be combined to form a modeled event, Sel_Chart_Pause, that indicates an occurrence of a user having difficulty updating a chart with data on a spreadsheet.

Variables in the Bayesian network may be binary and have just two states (e.g., absent and present), or may have multiple states. In cases where there are multiple values, the variable is set to one of the states corresponding to the observation. Binary observational variables are described, but the techniques also apply to variables with greater numbers of values. When the modeled event is observed and is passed to the inference system, the evidence variable corresponding to this event is set to "present" at the time noted for when the event occurred. Whenever probabilistic inference is performed on the Bayesian network, the status of all variables that could be set by modeled events are considered. As a result of inference we may see changes in hypothesis variables of interest. For example, given the occurrence of Sel_Chart_Pause, and other observations that update the probability that a user is having difficulty with chart-related tasks, the probability assigned to the hypothesis that a user is having difficulty updating the chart with data on a spreadsheet may increase.

Another example of a modeled event is the action of a user selecting the Undo command following any one of a set of chart-related commands. The occurrence of one of any atomic or modeled events in a set followed by an undo command would be composed as a Chart_Cmd_Undo modeled event. When this modeled event sets the corresponding evidence node in the Bayesian net, we might see an increase in the probability assigned to the hypothesis that the user may be having difficulty updating chart with data on a spreadsheet. Continuing the example above, atomic events for the modeled event, Sel_Chart_Pause, are (1) a user selects a bar chart, followed by (2) some minimal prespecified period of time (e.g., 10 seconds) in which there is a dwell, indicated a cessation of user activity.

Atomic events may serve directly as modeled events. For example, Del_Chart is an atomic event representing the deletion of a chart that is also modeled event, corresponding to the observation variable in the Bayesian network.

Modeled events also include contextual information about the state of data structures in an application. For example, Chart_View, means that a chart is present in the current display. This will increase the probability that charting assistance is relevant to the user.

Words appearing in a free-text query are also atomic events. Higher-level, modeled events may be defined as the appearance of one of a predefined set of words in a user's query. If a user's query is, "How do I change the colors in this chart?," the modeled event, that one of a set of words (e.g., in this case, a set containing as elements the words "modify," "convert," and "update") has been noted in the query, is passed to the inference system. Other important words in the query, such as "color" and "chart", are also detected as modeled events when they are noted to be in sets of previously modeled sets of similar words. These modeled events are analyzed in the same way as "convert."

The class of modeled events that are persistent across multiple uses of a software program are defined as profile information. These modeled events include events that indicate user competency or lack of competency and are stored in the user profile database. Modeled events stored in the user profile provide additional information about the user, such as the user's previous experience with particular application features or accomplishment of specific tasks, or review of tutorial material in the past. These events may correspond to variables represented in the Bayesian network and used by the inference system to adjust the evaluation of the hypotheses.

Other types of atomic events may include information about the presence or absence of user in front of the computer, as gleaned by proximity detectors, by visual features of the user, including information about the focus of the gaze of the user, expressions of the user, or gestures of the user, as identified by a video camera and vision recognition and tracking system, and speech utterances of a user as detected and processed by a speech understanding system.

After atomic events and their appropriate combination are identified for each of the modeled events, the next step 58 is to construct an event monitor for the software program that will survey user interface actions to extract the atomic events for input to inference analysis. The event monitor constructed is integrated with the software application to instrument that software application at step 60 in making an intelligent user assistance facility. Those skilled in the art will appreciate that the event monitor may be integrated within the application software, or may be a stand alone component that is part of a system library or operating system.

To complete the intelligent user assistance facility, an event processor is to compose modeled events from atomic user-interface actions (step 62). Next, a knowledge base is constructed from the model (step 64). The last step 66 is to construct an inference engine from the model which uses the knowledge base to determine suggested user assistance for the occurrence of modeled events. A Bayesian network with inference procedures serves both as a knowledge base and inference engine.

Figure 4:
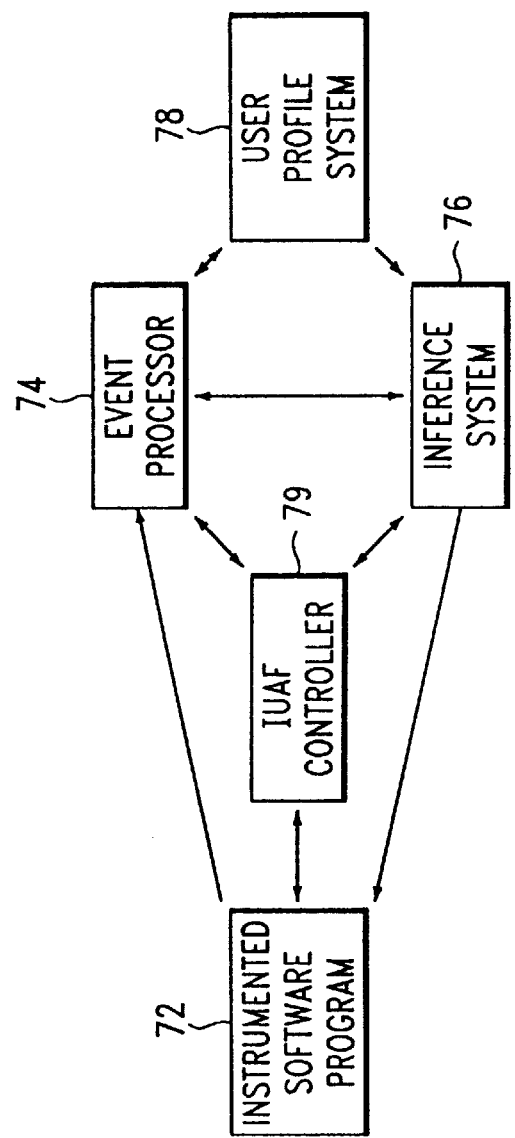
FIG. 4 is a block diagram of an Intelligent User Assistance Facility.

FIG. 4 is a functional block diagram of the components of an embodiment of an Intelligent User Assistance Facility constructed by using the method described above. The Intelligent User Assistance Facility includes a software program 72 that has been instrumented to monitor actions or events initiated by a user who is interacting with the software program. Periodically, these actions or events are scrutinized by an event processor 74 to discover whether any of them, either individually or in combination, represent observable variables in the Bayesian network. Modeled events are analyzed by an inference system 76 to form and evaluate multiple hypotheses of what assistance the user may need. These events can lead to increases or decreases in the probability that a user is experiencing a problem in using a particular application feature or in accomplishing a specific task.

The inference system 76 also accesses the user profile system 78 to check for competencies and changes assistance that is given based on user competence. User's background, successful completion of key tasks indicative of competence in particular areas, and previous help reviewed by the user are some of the variables stored in the user profile system 78.

The IUAF controller 79 initiates a cycle of inference analysis by the inference system 76 based upon the setting of its control mode. An inference cycle may be initiated whenever a user asks for help, or whenever one or more of any number of special events have occurred, or may simply occur on a regular clocked cycle, or for any combination of these modes. When the control mode is set to trigger an inference cycle upon occurrence of a special event or the control mode is set to occur on a regular clocked cycle, the inference system 76 will autonomously offer help to the user whenever the computed importance of coming forward exceeds the autonomous assistance threshold set by the user. When the control mode is set to initiate an inference cycle whenever the user asks for help, the inference analysis of user actions and program context is combined with an analysis of the words in a free-text query whenever the user submits a free-text query.

Those skilled in the art will appreciate that the functional blocks illustrated in the diagram may be implemented as separate components or several or all of the functional blocks may be implemented within a single component. For example, a separate library may be implemented that contains the reasoning system functionality and the event processor functionality. In such an implementation, the reasoning system may query the instrumented program periodically for all of the atomic events since the last query or may simply ask for a specific number of the last occurring events, and then the reasoning system may access the modeled event database for that particular software program to determining whether any of the atomic events are modeled events for input to inference analysis. Those skilled in the art will also appreciate that the inference analysis may be implemented to include only the ongoing analysis of user actions and program context except when a user asks directly for help with a free-text query. In that case, the inference analysis may be implemented to include only the analysis of the words in the free-text query whenever a user asks directly for help with a free-text query. Those skilled in the art will also appreciate that a separate analyses could be undertaken for different classes of modeled events, such as for words in a query and for actions in the interface, and the results of these separate analyses could be combined with the ability to control the weight given to the results of the different analyses.

Instrumented Program

Figure 5:
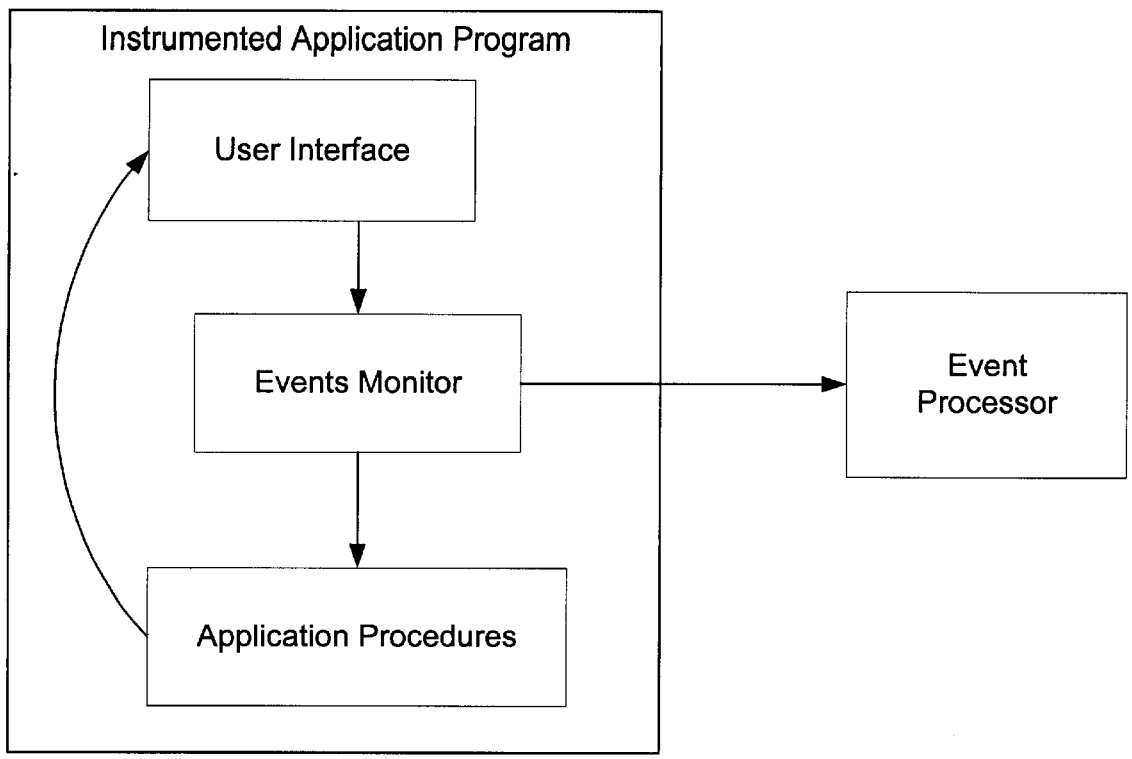
FIG. 5 is a block diagram of an imstrumented application program.

Any software program or library may be an instrumented program, including operating system programs and application programs. As an illustration of an instrumented program, an application program will be described. A typical software application contains a user interface and application procedures. As a user interacts with a software application using input devices such as depressing a key of the keyboard or clicking the button of a mouse, the operating system translates those user actions into events and sends them to the application program. The user interface component of the application program processes those events and forwards them to the appropriate application procedures for responding to those events. The event monitor constructed for the Intelligent user assistance facility fir a particular application may be integrated within the application software as illustrated by FIG. 5. In this configuration, the event monitor 84 watches for events passing from the user interface component to application procedures 86 and forwards them to the event processor through a call interface to the event processor. It also may be implemented as a stand alone component that is part of a system or application library which makes periodic calls upon the application program to send it all events since the last period or it may simply request that the application program send only a specific number of the last occurring events. Alternatively, it may be incorporated as part of the operating system in which case the event monitor screens events passing from the operating system to the application program and forwards them to the event processor.

Figure 6:
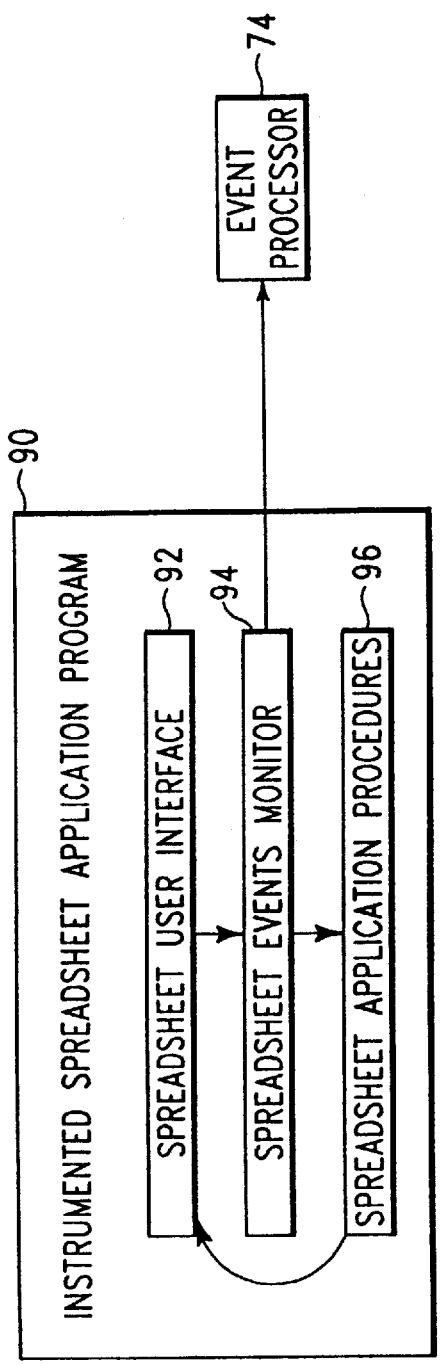
FIG. 6 is a block diagram of an instrumented spreadsheet application program for use with the Intelligent User Assistance Facility.

FIG. 6 is a functional block diagram of an instrumented spreadsheet application program as in the help-topic embodiment. As a user interacts with a spreadsheet application program using input devices, the operating system translates those user actions into events and sends them to the spreadsheet application program. For example, the user may place the pointer of the mouse on a menu item and may then click on the button of mouse. The operating system will translate that user action into an event that the user has clicked on an application menu item and send the event to the spreadsheet application. The user interface 92 component of the instrumented spreadsheet application program 90 receives that event and forwards it to the appropriate spreadsheet application procedures 96 for processing that event. The spreadsheet events monitor 94, watching for events passing from the user interface 92 component to application procedures 96, will see that event and forward a copy to the event processor.

Event Processor

The event processor is a general monitoring and event composing system that allows high-level events to be created from combinations of low-level events. The event processor does not need to include sophisticated reasoning capability. However, those skilled in the art will also appreciate that a variety of deterministic and probabilistic event preprocessing methods can be employed to work with arbitrary abstractions or clusters of events and to transform events into numeric information with a variety of mathematical functions, including those that might be directly interpreted as likelihoods.

Figure 7:
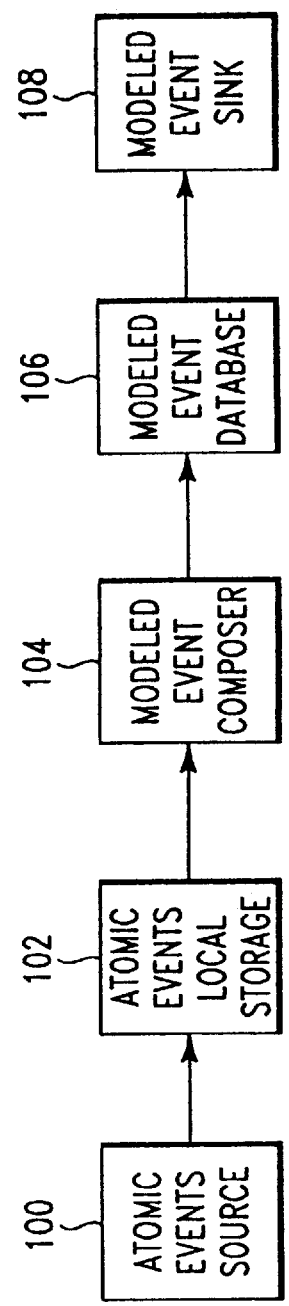
FIG. 7 is a block diagram of an Event Processor.
Figure 8:
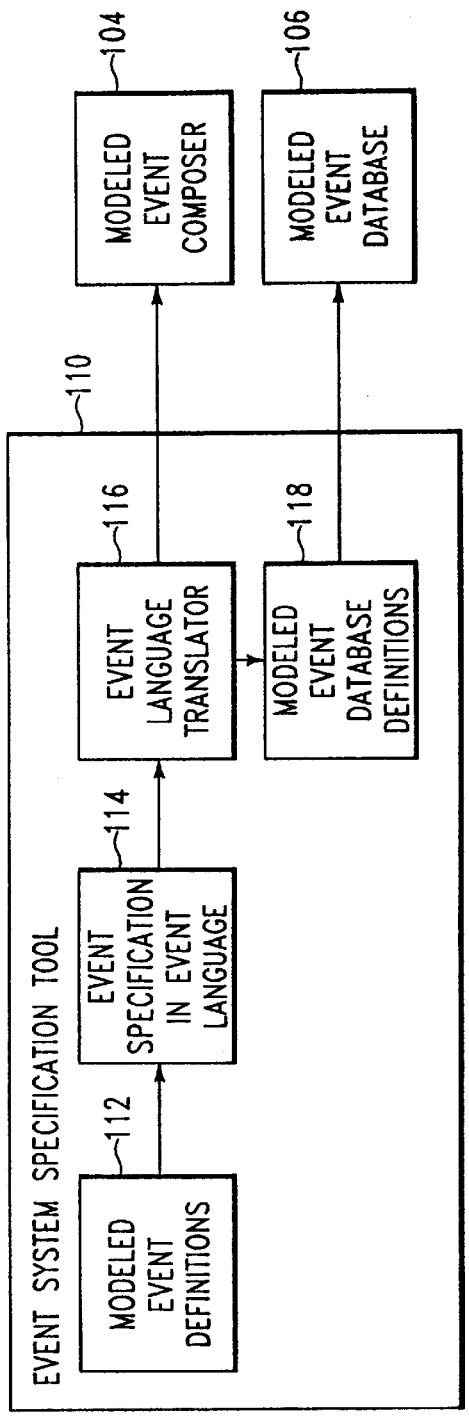
FIG. 8 is a block diagram of an Event System Specification Tool for creating a modeled event composer.

Since the Event Processor produces a set of logical events, any reasoning engine, rule-based or probabilistic, can utilize its output. FIG. 7 is a block diagram illustrating the components of the event processor. Atomnic events or user input device interactions are sent by an events source 100 such as an instrumented program to the event processor. The instrumented program may use a call interface that specifies the event information to the event processor. Upon receiving these events, the event processor may time-stamp each event and store them in local storage 102, such as system memory, in one of several kinds of data structures for storing information, including a database of records or finite circular queue ordered by the time stamp, or first in, first out order.

A modeled event composer 104 periodically surveys the atomic events in local storage 102 in search of one or more atomic events that may be composed into a modeled event.

This typically would be initiated by the inference system 74 at the beginning of an inference cycle; however, the modeled event composer 104 could perform composition of events between inference cycles such as whenever a new atomic event is received, or when special trigger events are received. The modeled event composer 104 then forms modeled events from atomic events according to the event composition rules defined in the event specification. The modeled event composer 104 stores each modeled event that the composer 104 generates from atomic events in the modeled event database 108.

Those skilled in the art will recognize that there could be implemented a modeled event database for each individual program employing the intelligent user assistance facility. For example, there could be a modeled database for each instrumented application program resident on a computer system. Those skilled in the art will also recognize that there may additionally be a separate general modeled database that contains common system or application events such as activating a program or exiting a program. In such a case, the inference system may access both the general modeled event database and the active program's modeled event database during a cycle of inference.

In one example of a modeled event database, there is a single record for every modeled event for that database. When a program with the intelligent user interface is activated, pre-existing persistent events stored in the user profile may be used to initialize the modeled event database. As modeled events are formed by the composer, the record for that event is updated in the modeled event database. An example of a record format for modeled events in this modeled event database is:

| Fields Name | Type | Description |
| --- | --- | --- |
| EventName | string | Name of modeled event |
| Occurred | boolean | Flag which indicates that the modeled event occurred within its horizon. |
| Atomic | boolean | Flag which indicates that the modeled event is derived from a single atomic event. |
| StartTime | real | Lowest start time on any atomic events from which this modeled event is composed. |
| EndTime | real | Highest end time on any atomic events from which this modeled event is composed. |
| Value | real | This field holds the result of the evaluation of an expression |
| LastTime | real | The time of last occurrence of the modeled event |
| Count | real | Total number of occurrences over all sessions |
| LastTimeThisSession | real | Time of last occurrence this session |
| CountThisSession | real | Number of occurrences this session |
| Persistent | boolean | Flag which indicates that this is a persistent modeled event. |

Of the fields used to count the number of occurrences and the rate of their occurrence, LastTime and Count are stored in the user profile database for all persistent modeled events. Upon initialization of the program, these fields get loaded from the user profile database into their corresponding modeled events in the modeled event database.

Modeled events are only relevant for a comparatively short time. This period of time during which a modeled event is relevant may be referred to as its horizon. Different events may have different horizons, a sixty second horizon is a suitable length of time for the horizon of most events generated by user actions. The duration of the horizon determines the length of time that a modeled event is considered in the inference system 76.

Each modeled event may be assigned a default system or application horizon or it may be assigned a specific horizon. Modeled events that have resided in the modeled event database 104 beyond their horizon time are discarded whenever the modeled event database 104 is accessed or updated. However, before they are discarded from the modeled event database 104, persistent modeled events are recorded in the user profile. The inference engine 76 and user profiler, in general, act as event sinks and access the modeled event database 104 to extract modeled event records. However, there is an exception. At program initialization time, pre-existing persistent events stored in the user profile may be used to initialize the modeled event database 104 and, as a consequence, modify the program's behavior.

Event System Specification Tool

The event specification tool allows for rapid creation of the modeled event composer and modeled event database for specific application programs during creation of an intelligent user assistance facility for that software program. A language was developed for constructing modeled events (e.g., menu surfing) from atomic events made available by a program, for instance an application (e.g., multiple menus visited without action within 10 seconds, position of cursor on spreadsheet, etc.). The language allows atomic events to be used as modeled events directly, as well as for atomic events to be formed into higher-level modeled events. Also, modeled events can be further combined to create other modeled events. More specifically, the language allows for Boolean combinations of atomic events and for combining the Boolean events into modeled events with operators that capture notions of temporality. The event specification tool can be linked directly with a Bayesian network modeling tool so that the modeled events and their definitions can be generated while building and refining the Bayesian user model.

FIG. 7 is a block diagram of an event system specification tool 110 used for generating code for the modeled event composer 104 and modeled event database definitions 118. Each modeled event definition 112 created during the step of defining modeled events is used to specify the events in the event language 114. The event specification 114 is then input to an event language translator 116 which translates the event language statements of the specification into high-level language code, such as C, to create the modeled event composer 104 component. The event language interpreter also creates the modeled event database definition. As part of that process, the event language interpreter 116 may also create the modeled event database 106 directly from the modeled event database definitions 118 in systems employing a database structure to store information on the status of modeled events.

The event language includes Boolean and set operators, with the addition of temporal operations including dwell and sequence. Modeled events are defined in a separate text module written in the event specification language. However, they can also be constructed with the use of special definition forms. The text definitions are created as named statement blocks for each modeled event. These definitions contain the labels of atomic events and indicate operations on one or more atomic events. The general form of a modeled event declaration in the event definition language is:

declare ModeledEventName
{
<expression list>
}

An example of the modeled event declaration for the Dwell_on_Chart modeled event is:

declare Dwell_on_Chart
{
(and (Select_Chart, Dwell(5,s))
}

The interpreter translates the syntax statement of the event definition language to the modeled event name, Dwell_on_Chart and updates the modeled event database by adding a record with that event name and initializes all record fields. A modeled event may be a complex synthesis of several other events, including other modeled events, or it may be simply a renaming of an atomic event. The event synthesis language supports infix expressions which entail logical combinations of atomic events, modeled events, arithmetic, and logical operators. As each elementary operation is performed, the intermediate result is treated as an event and has similar properties.

The event language has logical, set-lheoretic operators, temporal, and arithmetic operators. Operators allow the definition of specific events as well as events defined as generalizations based on sets of events. For example, higher-level events can be built via abstraction or generalization with operators like Element:

Element($\{x_1, \ldots x_n\}$): Any event drawn from the elements of the set of events $\{x_1, \ldots x_n\}$ occurs. Such sets can be defined as specific classes of events.

Temporal operators allow us to define events in terms of sequences of events over time. Temporal intervals may be measured in terms of the number of user actions, the amount of time, or other measures of duration that can be defined as functions of user actions and time. For example, it can be useful to define modeled events in terms of Scaled_seconds, a measure of duration where seconds are scaled by the rapidity at which a user is working, so as to adapt the temporal constants to users that work at faster or slower rates than an average user. When specifying temporal operators, we indicate the dimension of the measure of temporal interval by specifying the temporal dimension d with a value (e.g., c for commands, s for seconds, and for scaled seconds). Some useful temporal operators are:

Rate(x,t,d): At least x atomic events occur in duration t of dimension d.

Ensemble_N($\{x_1, \ldots x_n\}$,t,d) At least N events from the set of events $\{x_1, \ldots x_n\}$ occurs within interval t of dimension d.

All($\{x_1, \ldots x_n\}$,t,d): All events in a specified set of events $\{x_1, \ldots x_n\}$ occur within duration t of dimension d.

Sequence($\{x_1, \ldots x_n\}$,t,d): All of the events specified in a set of events $\{x_1, \ldots x_n\}$ occur within duration t of dimension d.

TightSeq($\{x_1, \ldots x_n\}$,t): All of the events specified in a set of events $\{x_1, \ldots x_n\}$ occur within occur within duration t of dimension d.

Dwell(t,d): No user action for t seconds or scaled seconds of dimension d.

In addition, parameters can be specified that the persistence or dynamics of probabilistic relationships between modeled events and other variables in a Bayesian network with increasing amounts of time since the modeled event has occurred. In the general case, we can provide any temporal function that describes how the probabilistic relationships of events to other variables in a Bayesian network change as the time following the occurrence of an event increases.

More specifically, the language allows the specification of how $p(E_i, t_o|H_j, t_p)$, the probability of event $E_i$ occurring at time $t_o$ in the past conditioned on the truth of hypotheses $H_j$ at the present moment, $t_p$ changes with the increasing amount of time $t_p=t$ since the event last occurred.

Useful distinctions for representing the temporal dynamics include horizon and decay:

Horizon: The interval of time beginning at the time $t=t_o$ that an event becomes true, that the probabilistic relationship persists as $p(E_i, t_o|H_j, t_o)$ without change. The probability remains unchanged as long as difference between the present moment, $t_p$, and the time, $t_o$, the event was most recently seen is less than the horizon.

Dynamic: The time-dependent functions that describe $p(E_i, t_o|H_j, t_p)$ and $p(E_i, t_o|\text{not}(H_j), t_p)$ after a horizon is reached. The dynamics can be summarized with a description of the change in the likelihood ratio defined by the ratio of these probabilities. The functions indicate how the initial probabilities $p(E_i, t_o|H_j, t_p)$ and $p(E_i, t_o|\text{not}(H_j), t_p)$ change as the time the event became true becomes increasingly distant from the present time, $t_p$. It can be asserted that these probabilities converge at some time to $p(\text{not}(E_i)|H_j, t_p)$, and $p(\text{not}(E_i)|\text{not}(H_j), t_p)$ and the initial likelihood ratio, when $t_p=t_o$, converges to the ratio of these latter probabilities, and, therefore, functions can be assessed that decay the probabilities or likelihood ratio from the initial likelihood ratio when $t_p=t_o$ to the likelihood ratio associated with absence of the event.

The probabilities can be computed as a function that takes as arguments the initial probabilities (at t_0), the probabilities associated with the finding being absent, and the time of the present moment, $t_p$, and ensures consistency among probabilities at any moment. That is, $$p(E_i, t_o|H_j, t_p) = f[p(E_i, t_o|H_j, t_o), p(\text{not}(E_i)|H_j, t_p), t_p]$$

and $$p(E_i, t_o|\text{not}(H_j), t_p) = f[p(E_i, t_o|\text{not}(H_j), t_o), p(\text{not}(E_i)|(\text{not}(H_j), t_p), t_p]$$

Operators being used to define modeled events may affect the duration information of the resulting modeled event. Conjunction results in storing the latest occurrence time of any subordinate events. results in storing the times associated with the first true subordinate event.

The Value field of the generated intermediate result of the modeled event is set according to the result of the expression. The result of all arithmetic comparison operations is either one (Boolean TRUE) or zero (Boolean FALSE). If the argument of an arithmetic operation is an event, the argument is evaluated as one if the event has occurred and zero if the event has not occurred. The time stamps associated with simple numbers are set to the span of the current cycle; in other words, the start time is the time of the last cycle and the end time is the current time.

Since the syntax allows for recursion, care should be taken that infinite recursion not occur. These statements are entered into a text file known as the event specification module.

The event specification module 114 is then processed by the event definition language translator 116. The event language translator converts the event specification language 114 into C++ code which may be compiled to machine language and linked directly to the event processor system library, IUAF library, operating system library, or other implementation library. The results of translating a high-level event specification is the modeled event composer 104 which creates modeled events. When the modeled event composer 104 is invoked during a cycle of inference, it builds the set of currently active modeled events and then returns to the caller. The inference code then performs appropriate actions indicated by the event set.

User Profile System

The inference system 76 accesses the user profile system 78 to check for competencies and changes assistance that is given based on user competence. User's background, successful completion of key, tasks indicative of competence in particular areas, and previous help reviewed by the user are variables that can be stored in a persistent file and updated with time. Such persistent information about user background, experience, and competence is referred to as "profile information."

Figure 9:
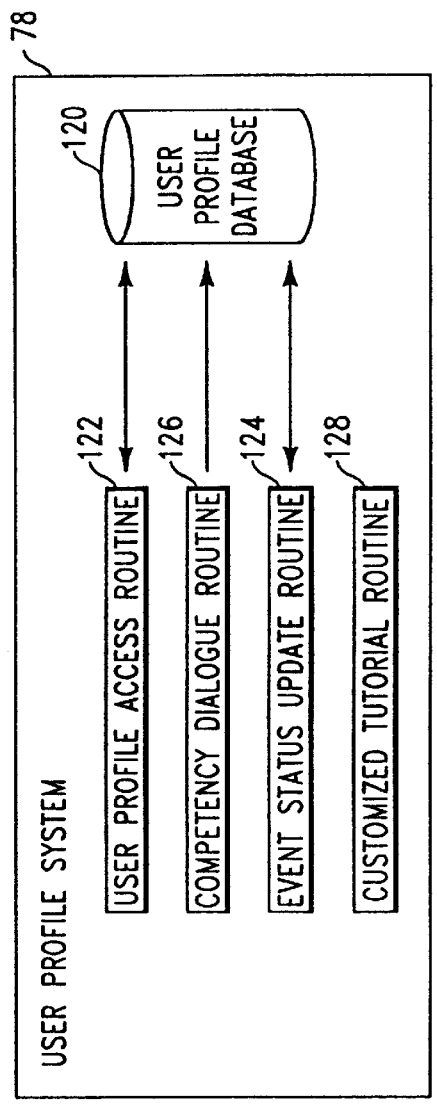
FIG. 9 is a block diagram of a User Profile System.

FIG. 9 is a block diagram of the user profile system 78. The user profile system 78 includes a user profile database 120, a user profile access routine 122, an event status update routine 124, a background and competency dialog routine 126, and a customized tutorial routine 128.

The user profile database 120 contains records identical in format to the records in the modeled event database 106 so that there is a common format between the modeled event database records and the user profile database records. This common format makes it more convenient both for updating the user profile database with modeled events and for the inference engine to interpret these records when it access these databases for inference analysis. The user profile database records are stored persistently so that they create an historical record of particular user's competency with specific software applications. This database is maintained on a by-user-by-application basis. An example of persistently stored modeled events that are indicative of user competency are the completion or non-completion of certain tasks, successful or unsuccessful use of particular features, and assistance received or help information reviewed in the past.

Figure 10:
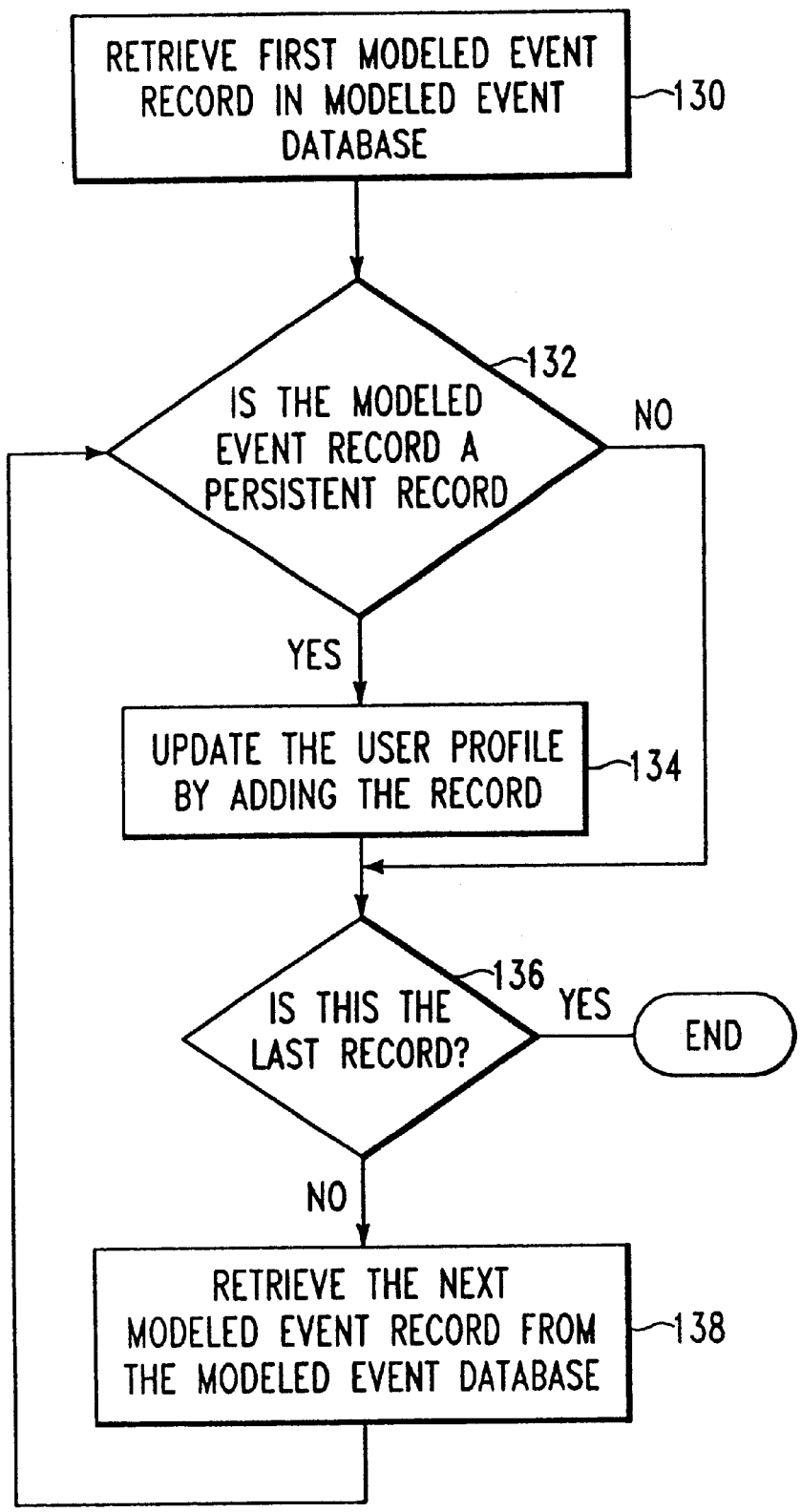
FIG. 10 is a flowchart of the Event Status Update Routine of the User Profile System of FIG. 9.

FIG. 10 is a flowchart illustrating how the user profile database 120 is updated with event status of a user interacting with a specific application program. The event status update routine 124 in step 130 retrieves the first modeled event record in the modeled event database and checks in step 132 whether the record is marked as a persistent record. If it is marked as a persistent record, then the record is added to the user profile database in step 134. If it is not marked as a persistent record, then it is not added to the user profile database. Each subsequent record in the modeled event record database is retrieved in turn (steps 136 and 138), checked whether the record is marked as a persistent record (step 132), and added to the user profile database if it is marked as a persistent record (step 134).

Figure 11:
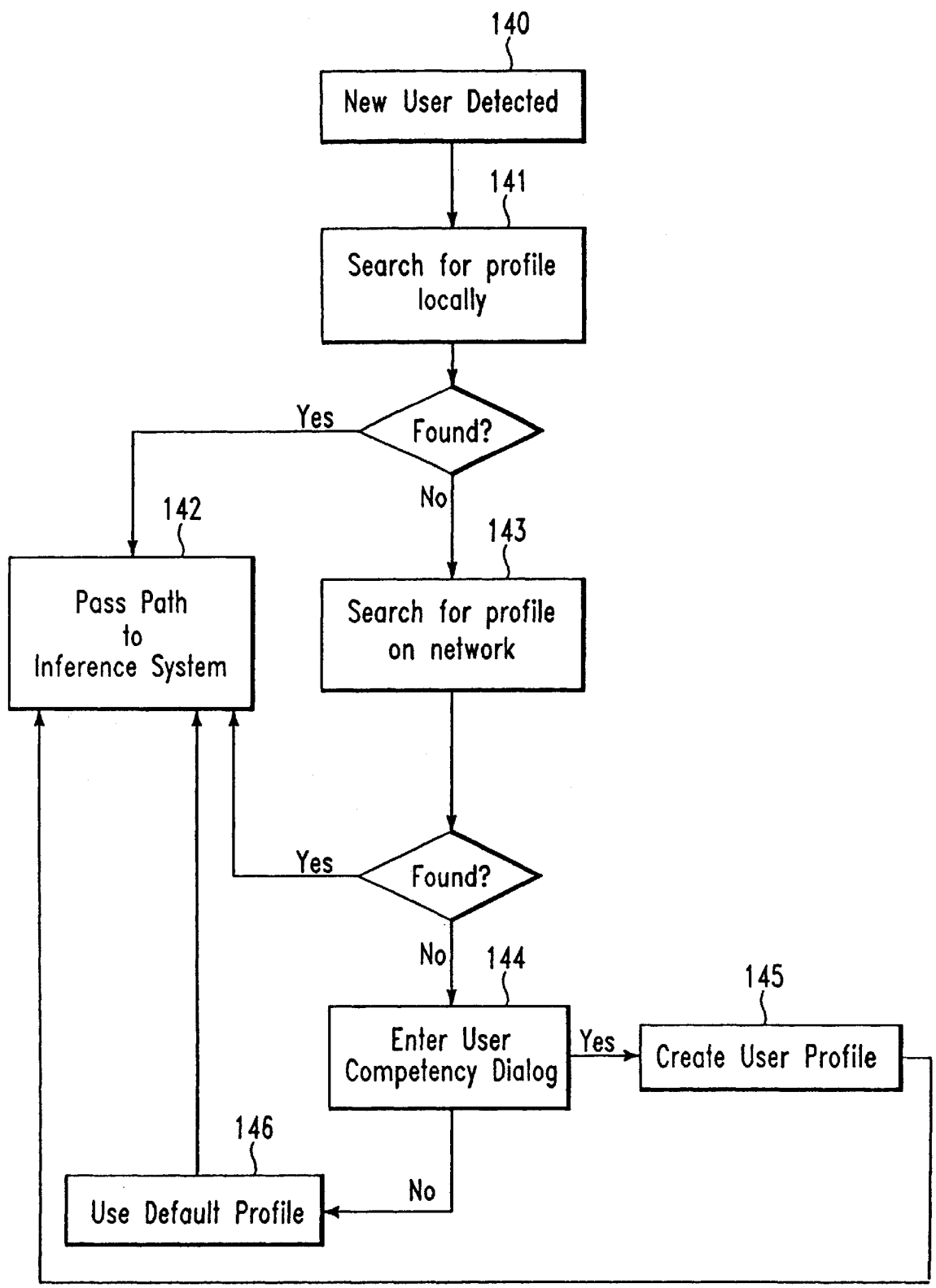
FIG. 11 is a flowchart of the User Profile Access Routine of the User Profile System of FIG. 9.

The availability of a standard stored user profile containing information about "persistent events" could follow a user around over a local network or over the Internet, custom-tailoring the user's software wherever the user may be. While a software application is active, a new user may log on to the system and use the active software application. FIG. 11 is a flowchart illustrating how a user profile is accessed whenever a new user signs on to the system or application. When a user logs on to the system or application (step 140), the user profile access routine 122 searches the local user profile database for that user's profile (step 141). If the profile is found, the path to that user profile is passed to the inference system 76 (step 142). If that user's profile is not found, because that user may be using the application at a remote location, then the user profile access routine searches the available networks for any user profile databases that contain the user profile (step 143). If the user's profile databases is not found or the user's profile is not found in any user profile databases accessed, then the user profile access routine asks the user for permission to enter a user competency dialog with the user (step 144) and creates a user profile for that user (step 145). The path for that user profile is passed to the inference system 76 (step 142). If the dialog is not completed, the path to default profile information is passed to the inference system 76 (step 146) and used.

Figure 22:
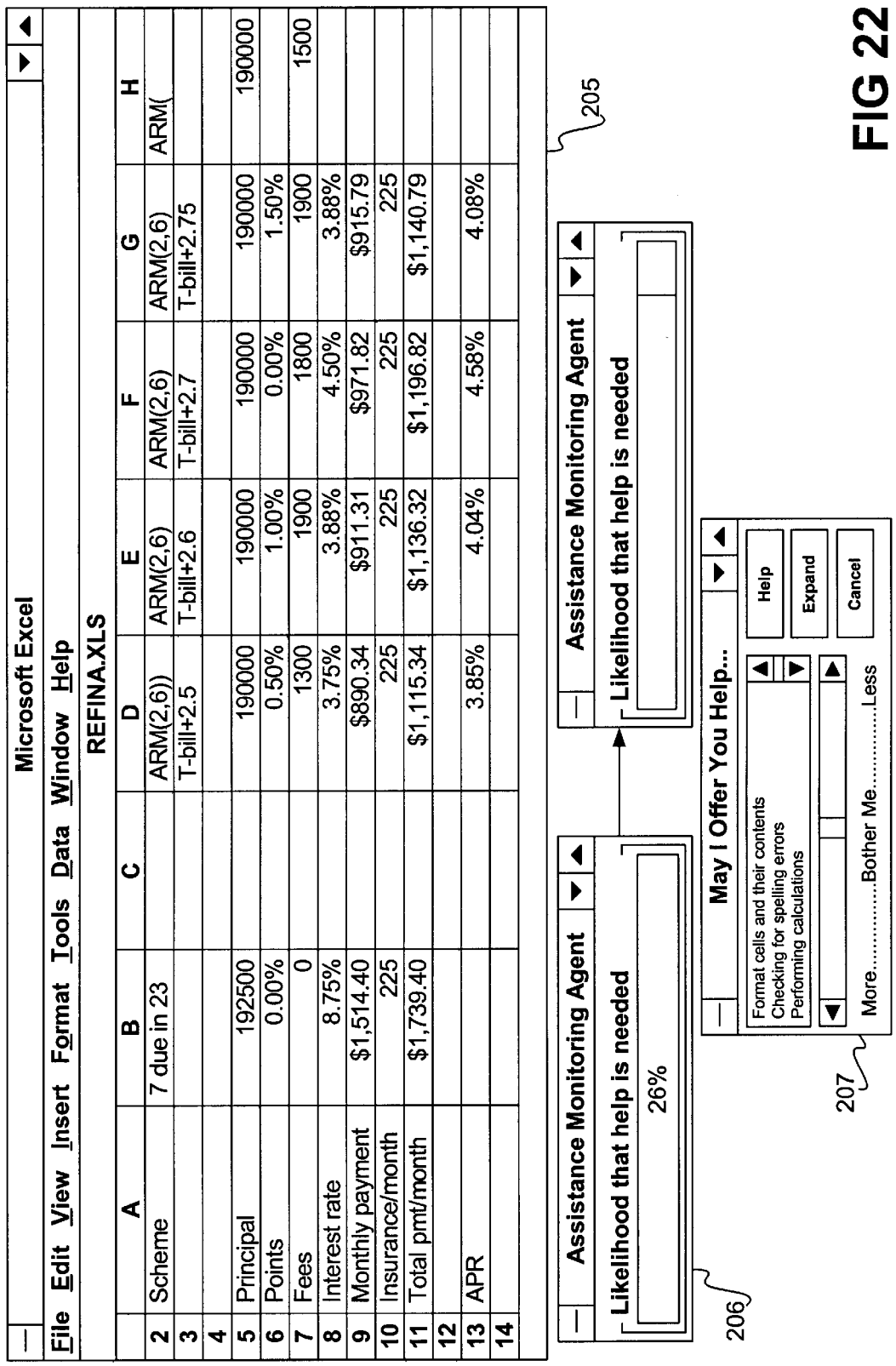

In addition to maintaining a persistent user profile for use during real-time inference, a continuing background analysis of repetitive patterns of a user's needs for assistance during one or more sessions that exceed a threshold, may be used to customize a tutorial of help information that may be offered to the user at the end of a user's session with the that program. FIG. 22 is a flowchart of the routine for generating a customized tutorial. During a user's session with a specific application program, a histogram of help topics exceeding a relevant probability threshold is recorded by the inference system 76 (step 150). When the user asks to quit the session with the application program, the user profile saves the histogram in the user's profile (step 152) and prepares a customized tutorial of help information related to the help topics recorded in the histogram (step 154). The user profile system notifies the user upon exiting the application program that a customized tutorial was prepared for online review or for printing as a manual (step 156).

Inference System

Figure 13:
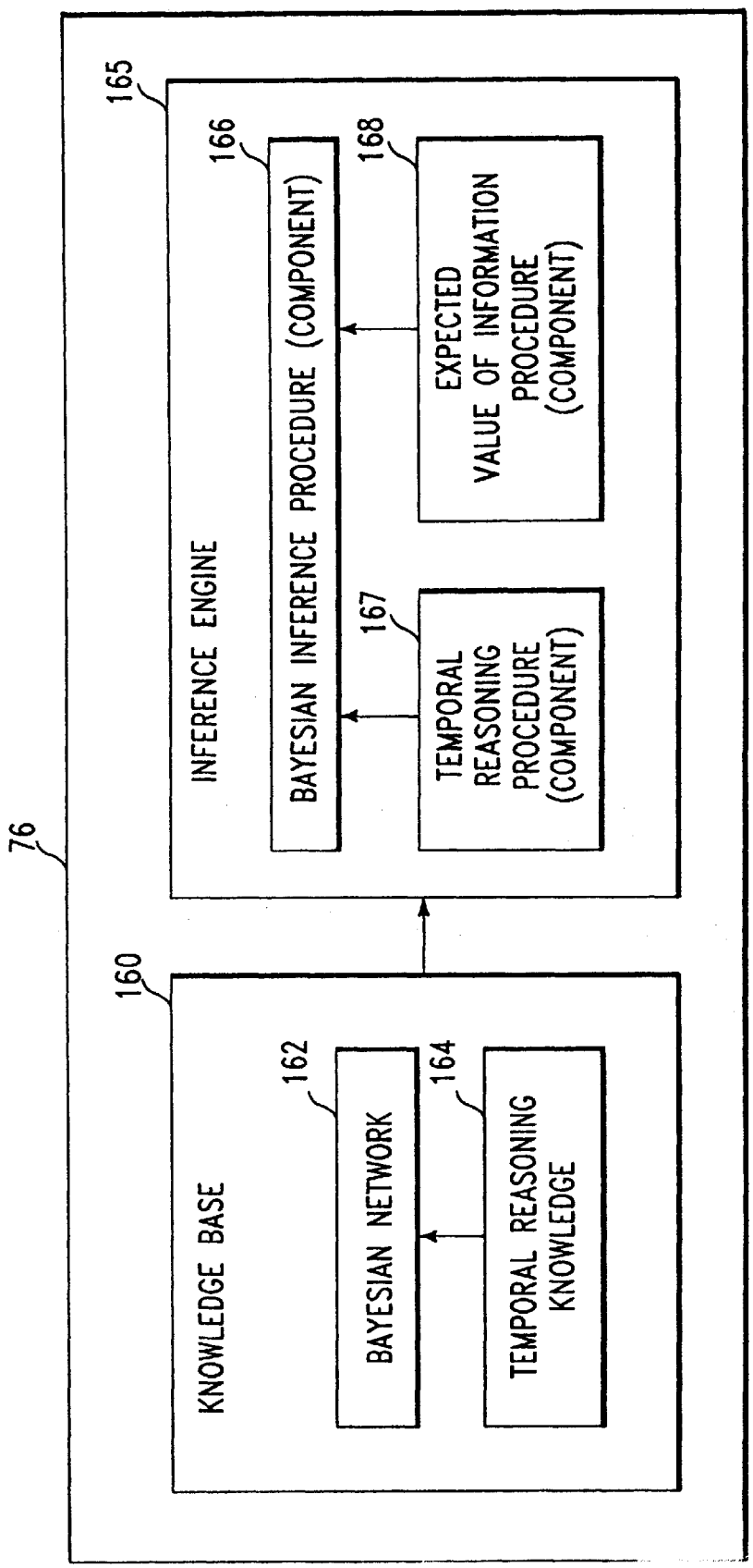
FIG. 13 is a block diagram of the Inference System of the present invention.

When a cycle of inference analysis is initiated, the inference system 76 accesses the modeled event database 106 to extract modeled event records for each of the modeled events that has occurred since the last cycle of inference. A functional block diagram of the inference system is displayed in FIG. 13. The inference system 76 includes one or more knowledge bases 160 and an inference engine 165. Knowledge bases 160 include information relating variables that represent observable states of the world, such as user actions and words, to variables that represent hypotheses of interest about a user's goals and needs for assistance that may not be observed directly or that are costly to observe. For example, the goals of users can not necessarily be directly inspected, but a sequence of computer commands can be recorded. A user can be actively queried about goals, but this may be quite distracting to users.

A deterministic knowledge base consisting of an interrelated set of logical rules may link observations to hidden hypotheses. However, it is often more appropriate to process the uncertain relationships as probabilities between observations and the likelihood of hypotheses about a user's needs. For example, in attempting to understand and to predict the behavior of a complex system such as human physiology it is typically not possible to completely model with deterministic relationships all components, of the system, and to then have access to a deterministic model for performing diagnosis or designing therapy based on a set of symptoms. For diagnosis and decision making about complex systems, we are often forced to reason under uncertainty, and to explicitly address the incompleteness in our understanding. Probability provides us with a means of diagnosis and forecasting about the behavior of complex systems given knowledge about a set of relationships among observational variables and hidden variables we may identify as being important. We can use probabilistic methods to represent and reason about weak and strong uncertain dependencies among observations, such as symptoms of a patient and variables such as diseases in a patient. A good example of complex system is a user attempting to perform a task while interacting with a computer software application or system. It is very difficult to build deterministic models that link a user's behavior to a user's goals and intentions. The best way to diagnosis a user's needs is to develop appropriate abstractions, based on our understanding of the relationships among various kinds of user's goals and actions, and to represent and reason about the relationships with probability. Probabilistic methods allow us to build models at a level of abstraction that is appropriate in light of our incomplete understanding about users and their actions.

A Bayesian network or a generalization of a Bayesian network, called an influence diagram, can be employed to represent the certain or uncertain relationships among user actions and such hidden, but important, states as user goals, user intentions, and user needs, given observable information such as one or more user actions. A Bayesian network is a directed acyclic graph where nodes are random variables and arcs represent probabilistic dependencies among those variables. Variables in a Bayesian network are chance variables or deterministic variables. A Bayesian network represents a joint-probability distribution for the set of variables it represents. The probability distributions over the values of chance variables depend on the values of direct ancestors, or parent variables that are parents of nodes. The value of deterministic variables is a deterministic function of predecessors. Influence diagrams are a generalization of Bayesian networks which represent additional nodes that represent possible actions and the utility of outcomes.

The inference engine 165 includes inference procedures 166 that operate on the knowledge base 160. The knowledge base 160 includes a Bayesian network 162. Those skilled in the art will recognize that the knowledge base may be a deterministic knowledge base with logical chaining procedures as the inference procedures of the inference engine. Or the knowledge base may be a Bayesian influence diagrams with inference procedures for operating on Bayesian networks as the inference procedures of the inference engine. Temporal reasoning procedures 167 and value-of-information procedures 168 are also included as part of the inference engine 165. Other specialized procedures may be included.

Bayesian inference procedures operate on Bayesian networks to compute a consistent posterior probability distribution over the values of variables in the network given the setting of states of observable, or evidence, variables to specific states based on the observations. Assume we are interested in the probability distribution over unobserved hypotheses of interest, $H_1, \ldots H_m$, and have access to observations and profile information $E_1, \ldots E_n$. Bayesian network inference algorithms compute a probability distribution over H given the observations, written $p(H| E_i, \ldots E_n)$. For influence diagrams, decision-theoretic inference is performed to identify the expected utility of alternative actions. The best action is the one associated with the highest expected utility.

In the most general sense, the task of designing inference for an intelligent user assistance facility is best undertaken from the perspective provided by decision theory, an extension of probability theory to reflect concerns of value under uncertainty. Influence diagrams allow us to express relationships about uncertainty, action, outcomes following action, and the value of those outcomes. This representation is useful in the design, understanding, and in many cases, the actual implementations of intelligent user assistance systems. However, it is often the case, that a simpler systems may be built without explicitly representing decisions, outcomes, and the utility of outcomes, and instead to use Bayesian networks to represent probabilistic relationships, and to use probabilistic inference in combination with procedural controls and thresholds as approximations of more complex influence diagram models.

Figure 14:
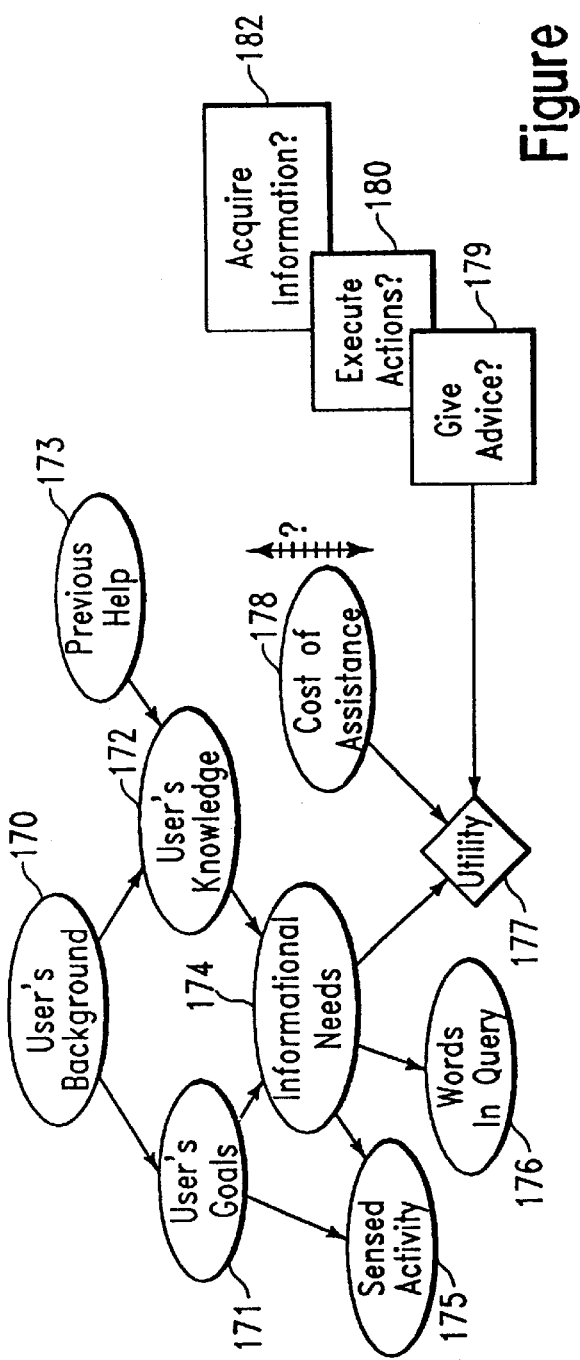
FIG. 14 is a Bayesian network diagram illustrating the overall influence relationship for any software program using the IUAF of the present invention to provide user assistance.

A general influence diagram for user modeling and action to assist users of software is portrayed in FIG. 14 as an exemplary embodiment of a Bayesian influence diagram as a knowledge base. As portrayed in the figure, a user's background 170 influences with uncertainty, a user's overall goals 171 in using software, as well as the user's knowledge 172 in using software. User's knowledge 172 is also influenced by the previous help 173 that user may have seen. The user's background 170 and previous help 173 are variables that can be stored in a persistent file and updated with time. Such persistent information about user background, experience, and competence is referred to as "profile information." As indicated in the influence diagram, the user's goals 171 and knowledge 172 in turn influence with uncertainty, the informational needs 174 of the user. The goals 171 and needs 174 in turn influence the sensed activity 175 and the words that might be used in a query 176 to the software, or software's help system. A utility function of the user 177 is represented as a diamond. The utility 177 is influenced directly by the informational needs 174 of the user, the cost of taking autonomous action 178 (e.g., distraction for the user's current focus of attention) and the action that is taken. Several classes of action may be available to the system, including the providing of advice or help 179, the execution of software actions of various kinds 180 and the acquisition of additional, previously unobserved information from the system, 181 or directly from the user. As indicated in the FIG. 14 by the scale on the cost of assistance variable 178, we may wish to allow the user to directly change the cost of the assistance so as to control, in a fluid manner, the degree of autonomy given to the system.

The overall goal of the inference system is to identify actions that will optimize the user's expected utility given the user's needs and the cost of taking autonomous action. Given a set of evidence E about a user's background and actions, the probability distribution over hypotheses of interest about a user's needs, H, is computed. In the case of the Bayesian influence diagram in FIG. 14, the probability distribution over a user's needs for assistance is computed. The expected value of actions in the set of all possible actions A must be considered. To do this, consider the utilities over outcomes, represented as a utility model (diamond node). The utility model contains information about the value or utility of outcomes. Outcomes (A,H) are defined as doublets of actions A taken and the state actual user's needs H. The utility model tells us the utility associated with each outcome, u(A,H). The best action to take, A*, is the action that maximizes the expected utility under uncertainty, computed as follows:

$$A^* = arg\ max_A \Sigma_j u(A_i, H_j) p(H_j|E)$$

Although influence diagrams represent explicit models of action, Bayesian networks are often easier to build and can be used for decision making and action by employing thresholds or rules about probability over variables in the network to indicate when actions should be taken based on the degree of belief assigned to a variety of states including states that describe preference about action. Influence diagrams such as the one portrayed in FIG. 14 can be used to clarify approximations used in the Bayesian network.

Temporal Reasoning and Dynamics

The inference system 76 also contains special temporal reasoning knowledge 164 in the knowledge base 160, and procedures 167 for performing inference about the changing relationships of observations to other variables in the model as the observations occur at progressively more distant times in the past. In the general case, applications of Bayesian procedures and knowledge bases to reasoning about patterns of observations seen over time requires the consideration of variables and their interdependencies within a single time and at different times. Building and performing inference with Bayesian networks that include copies of variables and dependencies for different times slides can lead to difficult computational reasoning problems and unacceptable response times for a user interacting with a program. Thus, several approximations are of value. In one kind of approximation, only specific dependencies considered to be of the greatest importance are considered over time.

Figure 15:
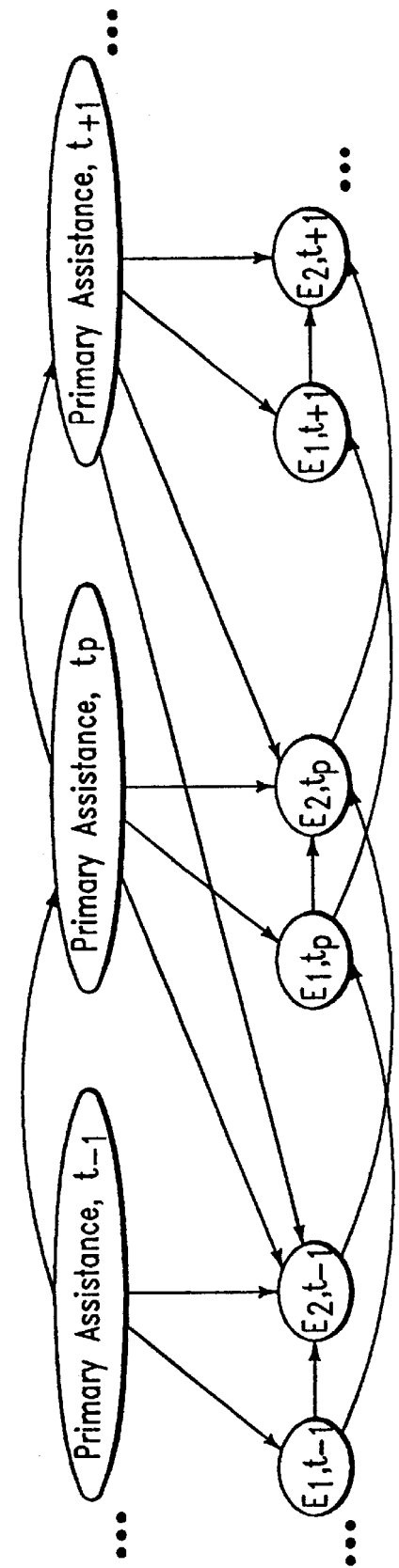
FIG. 15 is a diagram illustrating a portion of a Bayesian network representing some probabilistic dependencies over time.

A portion of a Bayesian network with sets of variables at different times and prototypical dependencies represented is displayed in FIG. 15. FIG. 15 displays a Bayesian network that explicitly represents random variables at different points in time, and probabilistic dependencies among variables at a single time and among variables at different times. The lack of dependencies among variables are assertions of assumptions of independence. The figure displays possible influences among the primary relevant assistance to provide a user at present moment with the most relevant assistance to provide users at earlier and later times. Also, the figure highlights potential dependencies among the status of observations ($E_i$ and $E_j$) in the present, with observations made in the past and future. The figure also indicates the relationship between the primary relevant assistance in the present and observations in the past. In the general case, such multiple-connected networks axe difficult to solve and to assess during the construction of the models.

We will now describe an approach to reasoning about relevant assistance over time that is more tractable to solve and to assess, through making additional assumptions of independence and representing the relationships among evidence seen at progressively more distant times in the past and hypotheses of interest with parameterized functions that dictate the strength of the probabilistic relationship between those observations and current the goals or needs for assistance. The use of this approximation in an exemplary embodiment employs a single explicit Bayesian network, but allows the system to consider implicitly multiple Bayesian networks over time. This method takes advantage of direct assessment during modeling time of functions that adequately describe the dynamics of the probabilistic relationships between observed variables and other variables in a Bayesian network. At modeling time, a horizon and dynamics are assessed for each observational variable $E_i$, and the variable is annotated with this information. At run-time, the inference engine 165 includes procedures 167 for using this information about horizon and dynamic. The horizon for an event captures the interval of time the probabilistic relationships with hypothesis $H_j$ persists as $p(E_i, t_o | H_j, t_o)$ and $p(E_i, t_o | \text{not}(H_j), t_o)$ without change. The dynamics is the time-dependent change of the probabilities in the present moment as described earlier.

Heuristics in defining a horizon for events include the use of a default horizon for all observational events considered by a system unless otherwise specified, and the use of an event queue of finite length k, where only the last k modeled events are considered in the analysis. This approach can be combined with dynamics as just described.

Value of Information

The inference engine 165 also includes expected value of information (EVI) procedures 168 to compute the expected value of acquiring information from a user. EVI procedures and information-theoretic approximations that can be employed in probabilistic models are well-known to people skilled in the art of decision theory. The EVI is a means for computing the expected value of acquiring information about variables that have not yet been observed. Such information includes answers by users to questions posed by the computer system about their goals and needs. The Net Value of information (NEVI) is net value of gathering information, including the costs of gathering the information. The inference system 76 only asks a question, or gathers information autonomously, when the informational benefits of the information outweigh the costs. If $E_x$ refers to each previously unobserved variable that can be queried, $O_k$ is a possible observational value of $E_x$, and A is the value that will be observed when the variable is evaluated, the NEVI of each variable is:

$$NEVI(E_x)=\Sigma_k p(E_x=O_k|E)^*[\max_A \Sigma_j u(A_i, H_j) p(H_j|E, E_x=O_k)]- \max_A \Sigma_j u(A_i, H_j) p(H_j|E) - C(E_x)$$

where $C(E_x)$ is the cost of evaluating evidence $E_x$. EVI can be applied directly to influence diagrams. Several well-known information-theoretic algorithms, including those based on computation of entropy, function to provide similar functionality for decisions about information gathering in probabilistic models such as Bayesian networks. These algorithms are typically more tractable than computing NEVI with influence diagrams. They do not explicitly manipulate utilities, but nevertheless can be employed in conjunction with heuristics that balance the cost of information with measures of informational value.

Figure 16:
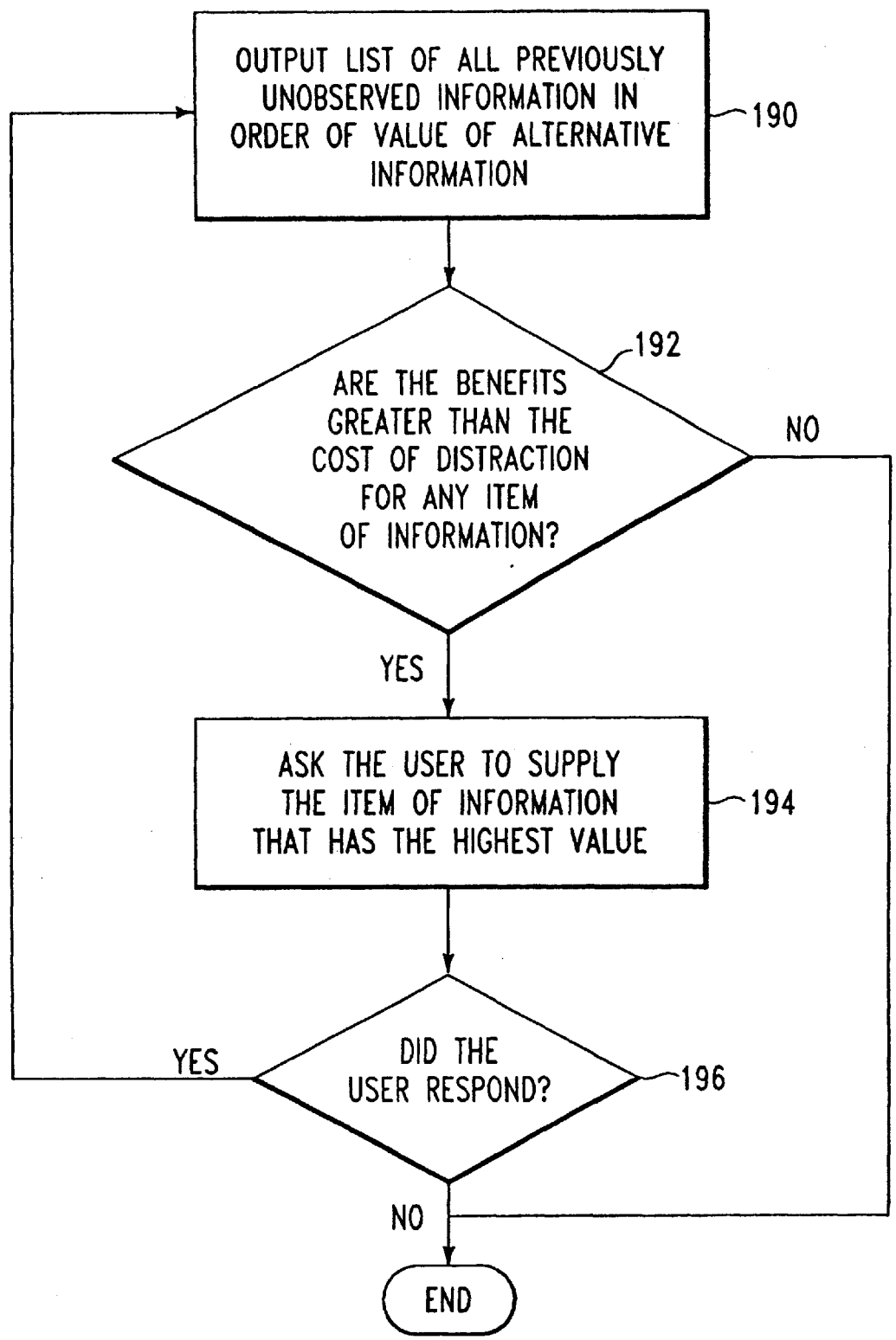
FIG. 16 is a flowchart of the value-of-information procedure according to the principles of the invention for acquiring user information.

FIG. 16 is a flowchart of value-of-information procedures in the value of information component. The value of information component lists all of the previous unobserved information in order of the value of it as alternative information (step 190) and weighs the benefits of obtaining the information against the cost of distracting the user for each item of information (step 192). If the benefit is greater than the cost set by the user, the IUAF asks the user to supply the item of information that has the highest value (step 194). If the user responds, then the value of information component repeats the first two steps until either the cost of distraction is greater than the benefits of obtaining the information or the user does not respond (step 196).

Scenarios Illustrating the Screen Outputs of the IUAF

Figure 17:
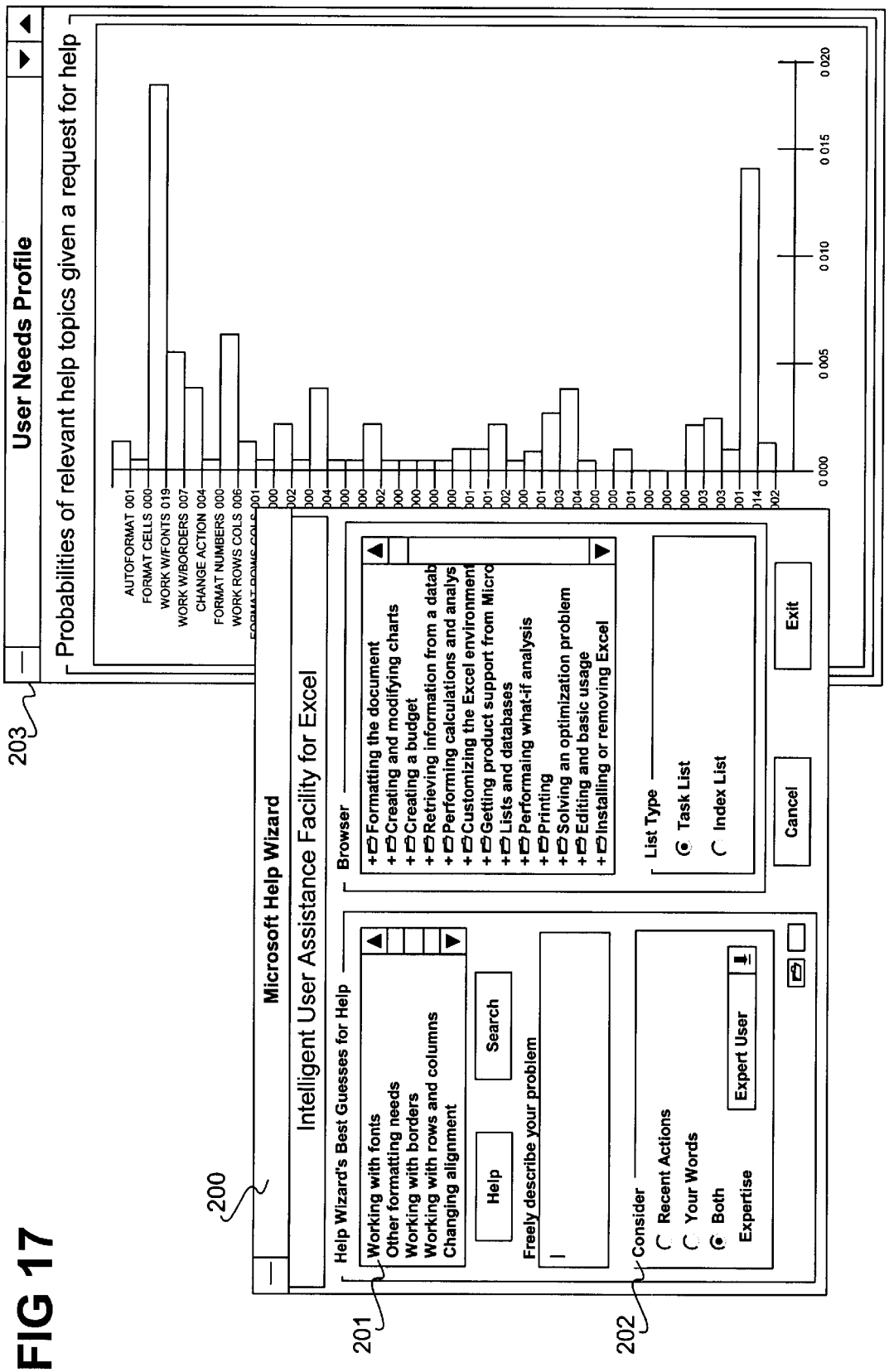
FIGS. 17–22 illustrate screen outputs of the IUAF made in accordance with the principles of the present invention in an exemplary embodiment of a spreadsheet application.

FIGS. 17 through 23 illustrate the screen outputs of the intelligent user assistance facility in an exemplary embodiment of a spreadsheet application. The system considers a user profile, user-specified threshold information, and combines words and user actions to provide intelligent assistance to the user. The system has the ability to respond to requests for assistance as well as to autonomously provide assistance. FIG. 17 shows an assistance interface 200 that is generated when the user explicitly has requested help. Guesses about useful assistance to provide the user are displayed in the list box 201 in the upper left-hand corner. The current system settings box 202 in the lower left-hand corner indicates the user is an expert user. This information was provided by the user profile system. The current system setting box 202 also indicates that both user actions and free-text queries are used by the inference engine during a cycle of inference analysis. Given the profile information and the recent actions involving interaction with the layout of text, in combination with pauses, and with the user taking action to change the appearance of rows and columns shortly before help was actively requested, the system believes the user may best benefit by receiving assistance on working with fonts, advanced formatting instructions, and with methods for changing the dimensions of the spreadsheet document. To the right of this screen photo is displayed an inference graph 203 showing the probability distribution over a set of task areas that was generated by the Inference System 76. This display was built for engineering purposes but may be displayed to the user. The length of the bar graph next to each task area is the probability assigned to that area. The two highest probability areas (those with the longest associated bar charts) are for the tasks of working with fonts and advanced formatting topics.

Figure 18:
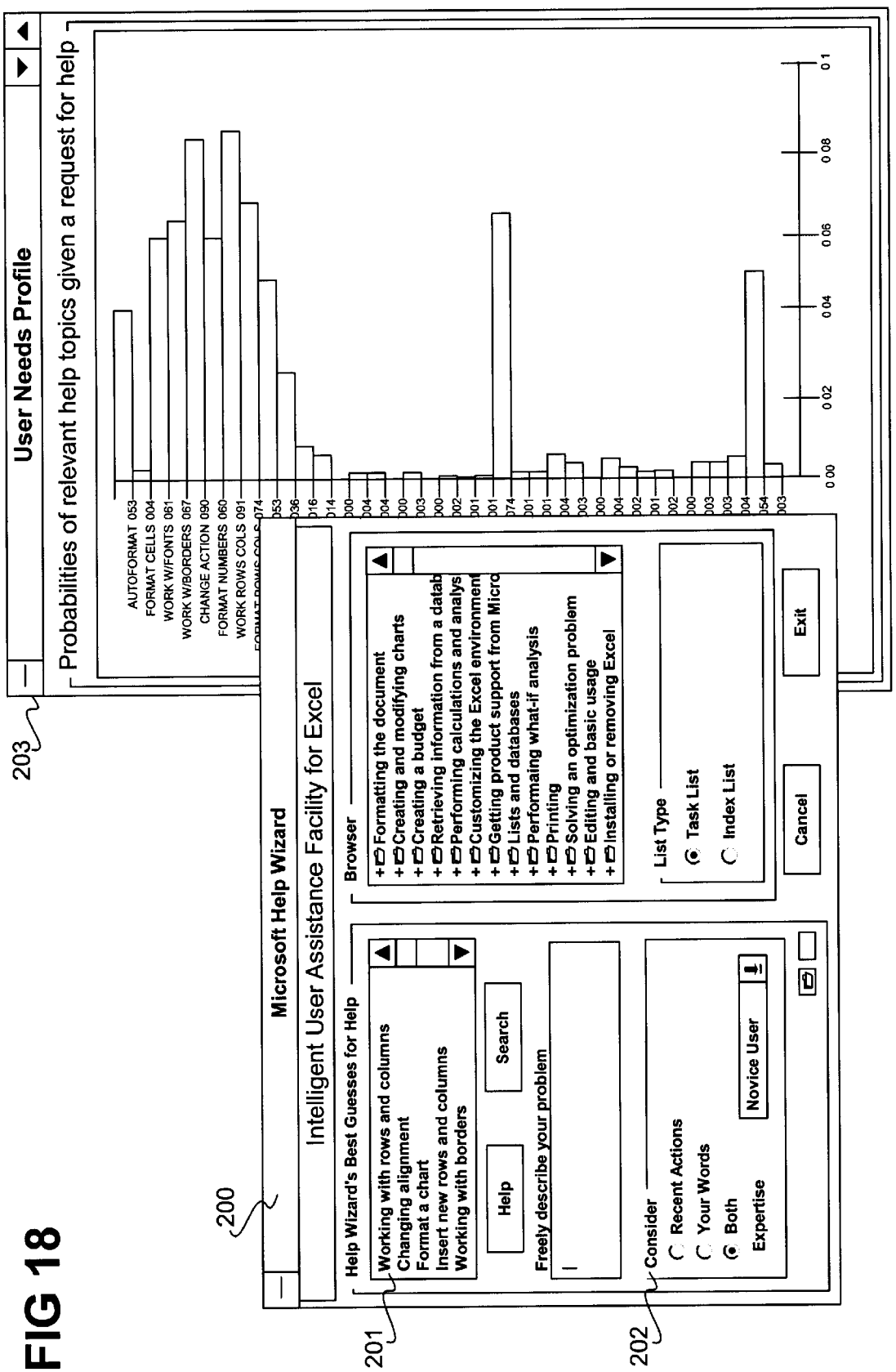

In FIG. 18, the profile information was changed to a profile for a novice user. The expertise level in the current systems setting box 202 indicates that the user has a level of expertise of a novice. All other events handling remained unchanged. We have used a profile for a novice user. The profile information is used to modify the probabilistic relationships in the Bayesian network. The inference graph 203 displaying the probability distribution over relevant assistance shows the revised probability distribution with the profile information. As can be seen in the best guesses list box 201, the system now believes that the user may most benefit by assistance with basic working with rows and columns of the spreadsheet, changing alignment and basic formatting of charts.

Figure 19:
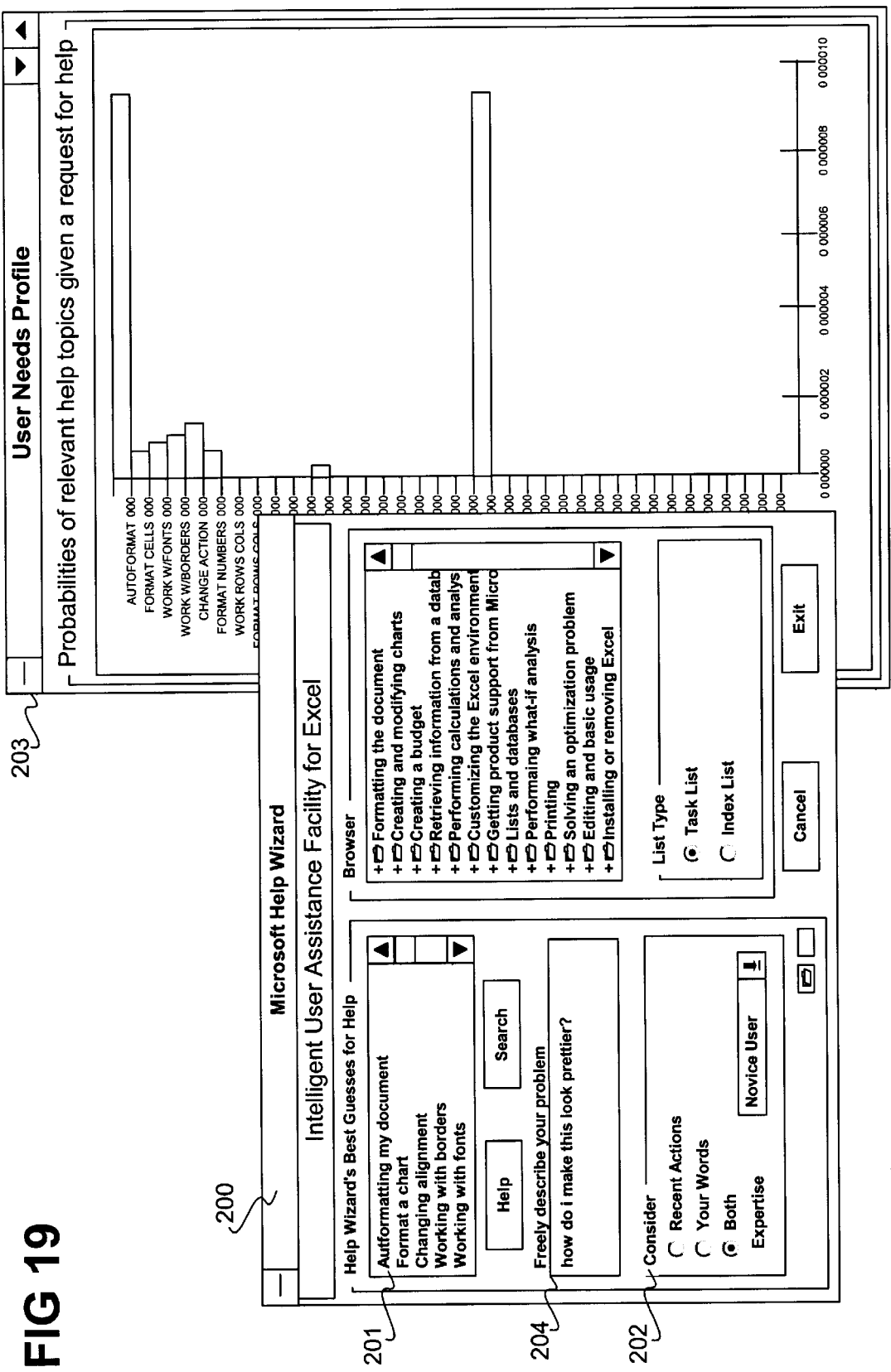

FIG. 19 shows the analysis of the same set of user actions, but now, with consideration of the words in a user's query. The user has input to the system the natural-language query, "How do I make this look prettier?" in the query input box 204. The analysis of the words and the actions are combined to generate a new probability distribution, as indicated in the inference display 203, and a new corresponding list of recommended topics in the best guesses list box 201. Now, the list is resorted and updated with autoformatting assistance being recommended as the most relevant assistance, but also still contains other formatting topics, including changing alignment, working with borders, and working with fonts.

Figure 20:
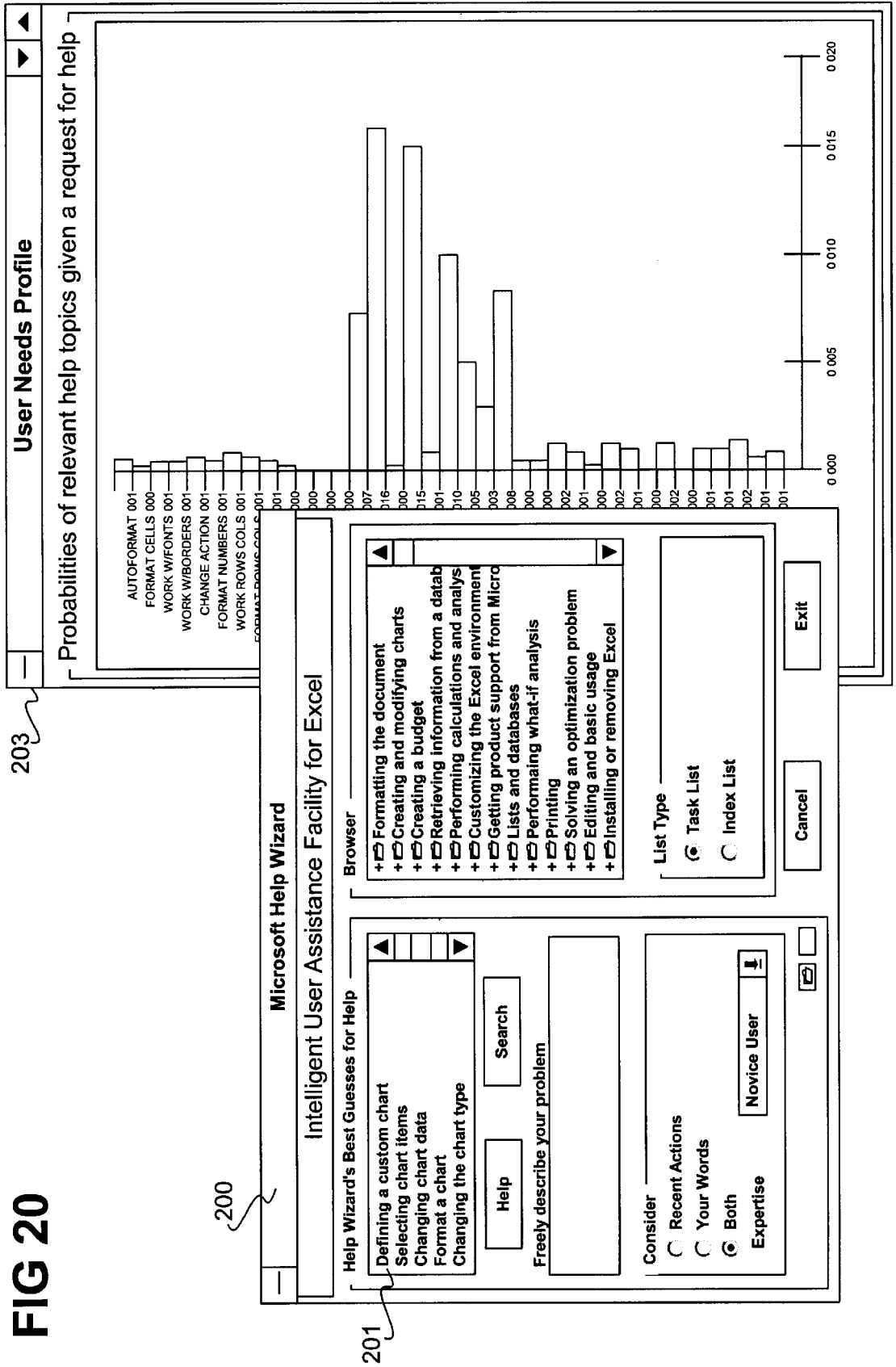
Figure 21:
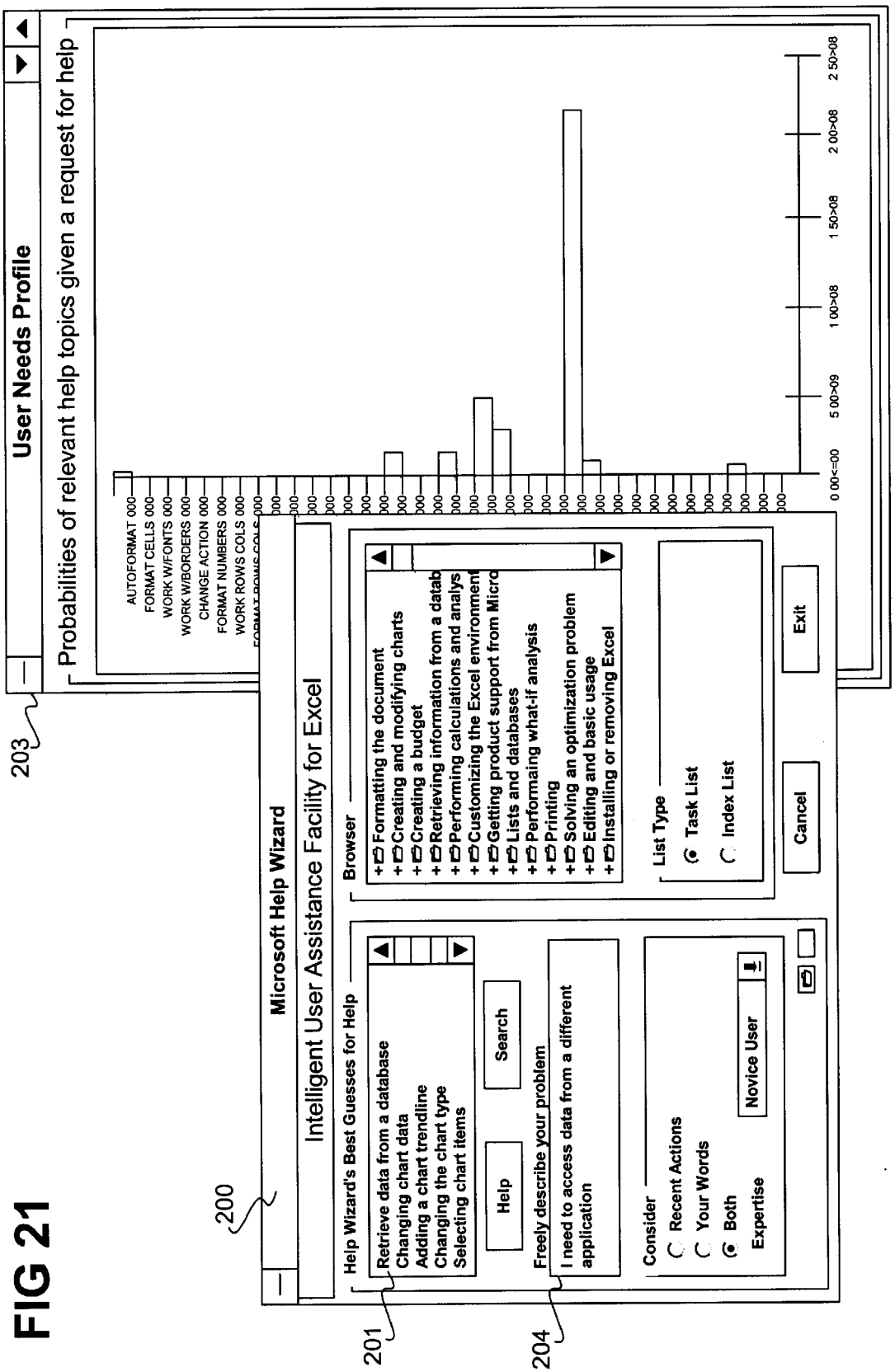

FIG. 20 shows the program at a later time when help is again requested after interaction with a chart in the document, coupled with pauses on chart commands. The probability distribution computed by the inference system 76 is displayed in the inference graph 203. Now, the recommended topics in the best guesses list box 201 focus on a variety of high-likelihood areas in the area of graphing information. FIG. 21 shows the addition of information submitted in the form of a query in the query input box 204. The natural language query from the user is, "I need to access data from a different application". The words are now considered in conjunction with the events. The inference system 76 provides a revised probability distribution in the inference graph 203 and a revised list of recommended topics in the best guesses list box 201, centering in retrieving data from a database and about changing the data displayed in a chart.

FIG. 22 illustrates the screen outputs of the inference system 76 offering autonomous help to a user. While the user has been interacting with a spreadsheet program 205, an assistance monitoring agent computes the probability that a user needs assistance and the inference system 76 also computes the likelihood of alternative kinds of help to give the user, should the user require assistance. The assistance monitoring agent displays the result of inference on the probability that a user needs assistance in the assistance monitoring agent window 206. Like the inference graph 203 display described above, the assistance monitoring agent 206 was built for engineering purposes but may be displayed to the user. The user who has been interacting with a spreadsheet program 205, now selects the whole sheet and pauses. As the assistance monitoring agent window 206 shows, the computed probability that the user needs help moves from 26% to 89%, reaching a threshold, and a small timed window, the autonomous assistance window 207, autonomously comes forward displaying the highest likelihood assistance areas that were computed. In this case, the highest likelihood topics include formatting cells, checking for spelling errors, and performing calculations, topics that have implications for analysis or modification of the entire document. The autonomous assistance window 207 politely offers help. It also provides a chance for the user to reset a threshold that will increase or decrease the probability required on the likelihood the user needs help before displaying the window. The window 207 will time out and be removed with an apology for distracting the user if the user does not interact with the window 207.

Figure 23:
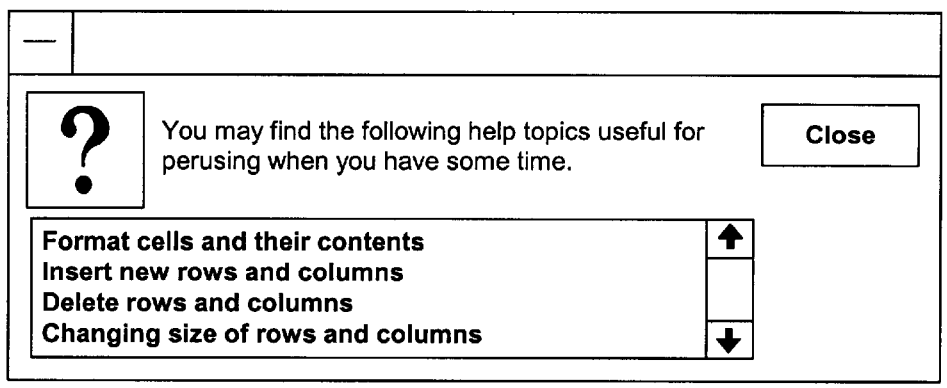
FIG. 23 illustrates screen output of the IUAF according to the principles of the present invention in an exemplary embodiment of a spreadsheet application for displaying a summary of a custom-tailored tutorial.

FIG. 23 illustrates the display 208 of the topics that have been determined to be of value to the user based on the recording and summarization of ongoing background inference about problems that user has been having during a session using a software program. Profile information about the user's background, competence, and about the assistance that the user has received or reviewed in the past are also included. These topics have been prepared for printing as a custom-tailored manual for later perusal.

Bayesian Network Annotated with Temporal Reasoning

Figure 24:
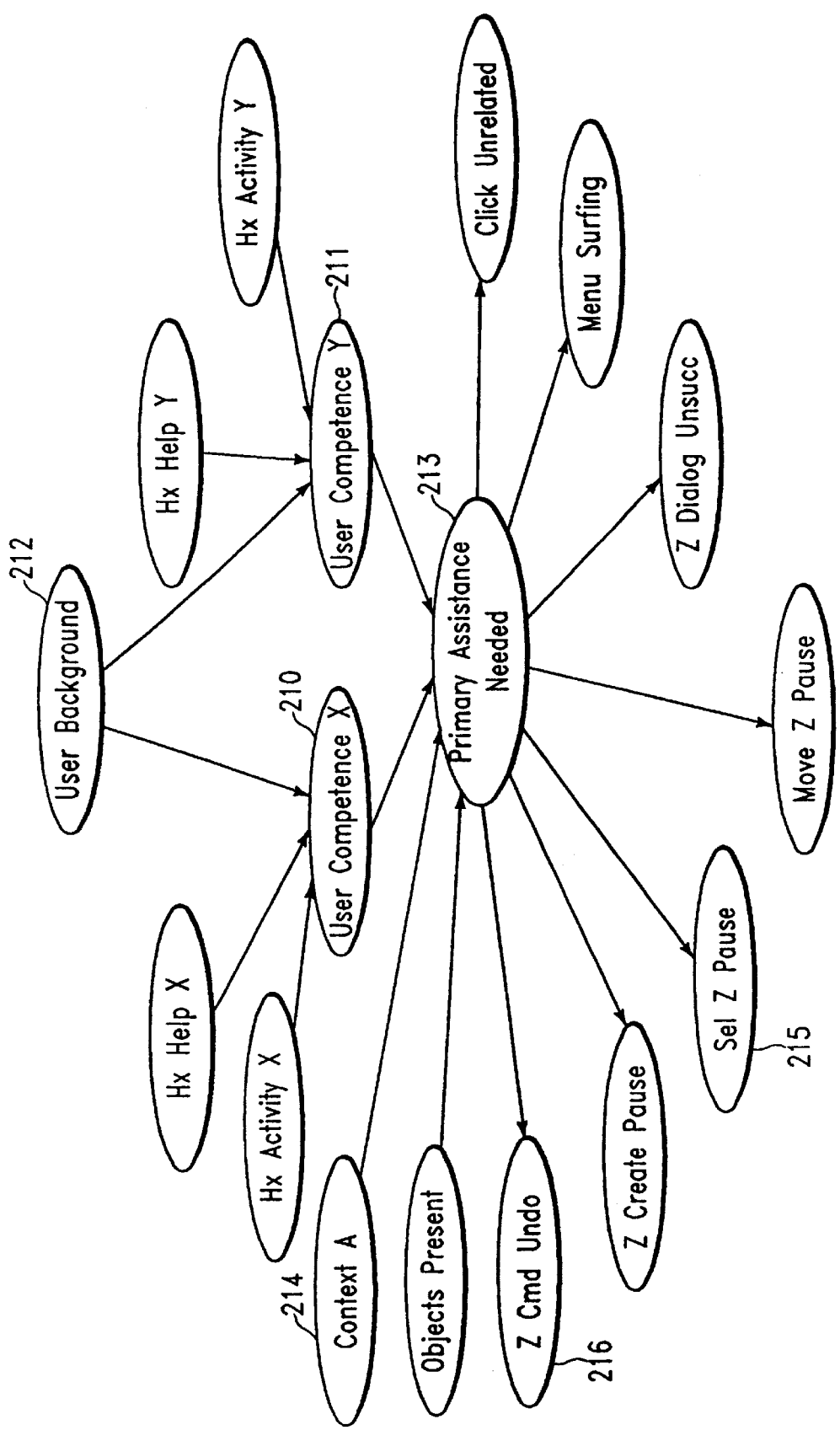
FIG. 24 is a portion of a Bayesian network for IUAF made in accordance with the principles of the present invention.

FIG. 24 shows an example of a Bayesian network that computes the probabilities of alternative forms of assistance to provide a user as a function of profile information about the user, as well as recent actions taken by the user. To indicate that this structure may be repeated for many classes of observations and task-specific needs for assistance, variables x, y, z, and A have been used in several of the nodes.

In this model, we represent profile variables that represent the status of user competency in two different areas of software functionality, x and y, with a set of variables labeled User Competence x 210 and User Competence y 211. The user competencies are each influenced by variables representing (1) specific observed activities by the user, (2) the history of help topics that have been reviewed by the user, and (3) the overall user background 212 that may be uncertain or set by a dialogue with the user. As indicated in the Bayesian network, the user competencies directly influence the prior probability of different assistance being relevant to the user, as represented by the states of the Primary Assistance Needed variable 213. This variable is also influenced by a context variable 214, that describes information about program state, such as the existence in the current version of an application of a particular data structure. In this model, the problem is formulated with a single primary assistance variable, with states representing alternate forms of assistance. The model assumes that there is only one state of primary assistance the user needs at any particular time. Multiple variables about assistance can also be represented to capture the notion that several types of assistance may all be relevant at a single time.

As depicted in the Bayesian network, the Primary Assistance Needed node 213 influences a set of observed modeled events, such as selecting a graphical object Z, then pausing for more than some predefined period of time (Sel Z Pause 215), or modifying an object and then performing an undo, (Z Cmd Undo 216). At run time, these modeled events are detected and passed to the Inference System 76 by the Event Processor 74. The corresponding observable variables to the modeled events are update and Bayesian inference is performed to update the probabilities over all of the unobserved variables in the system, including the Primary Assistance Needed variable 213. The time of the event is noted and as the event flows progressively into the past, temporal reasoning procedures 167 are applied to update the probabilistic relationships in the network.

Figure 25:
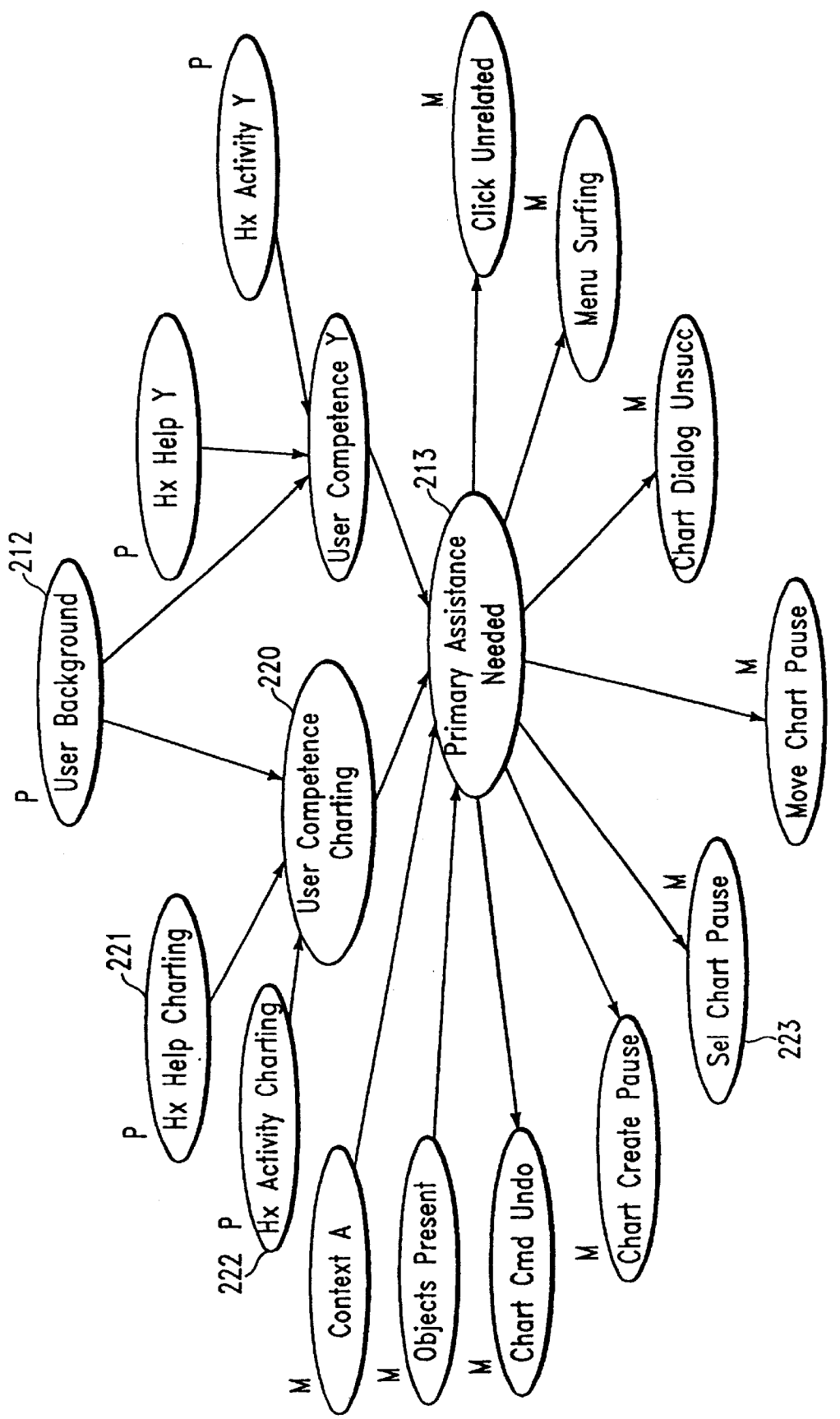
FIG. 25 is a portion of a Bayesian network for a spreadsheet application illustrating modeled and profiled events for charting data of a spreadsheet.
Figure 36:
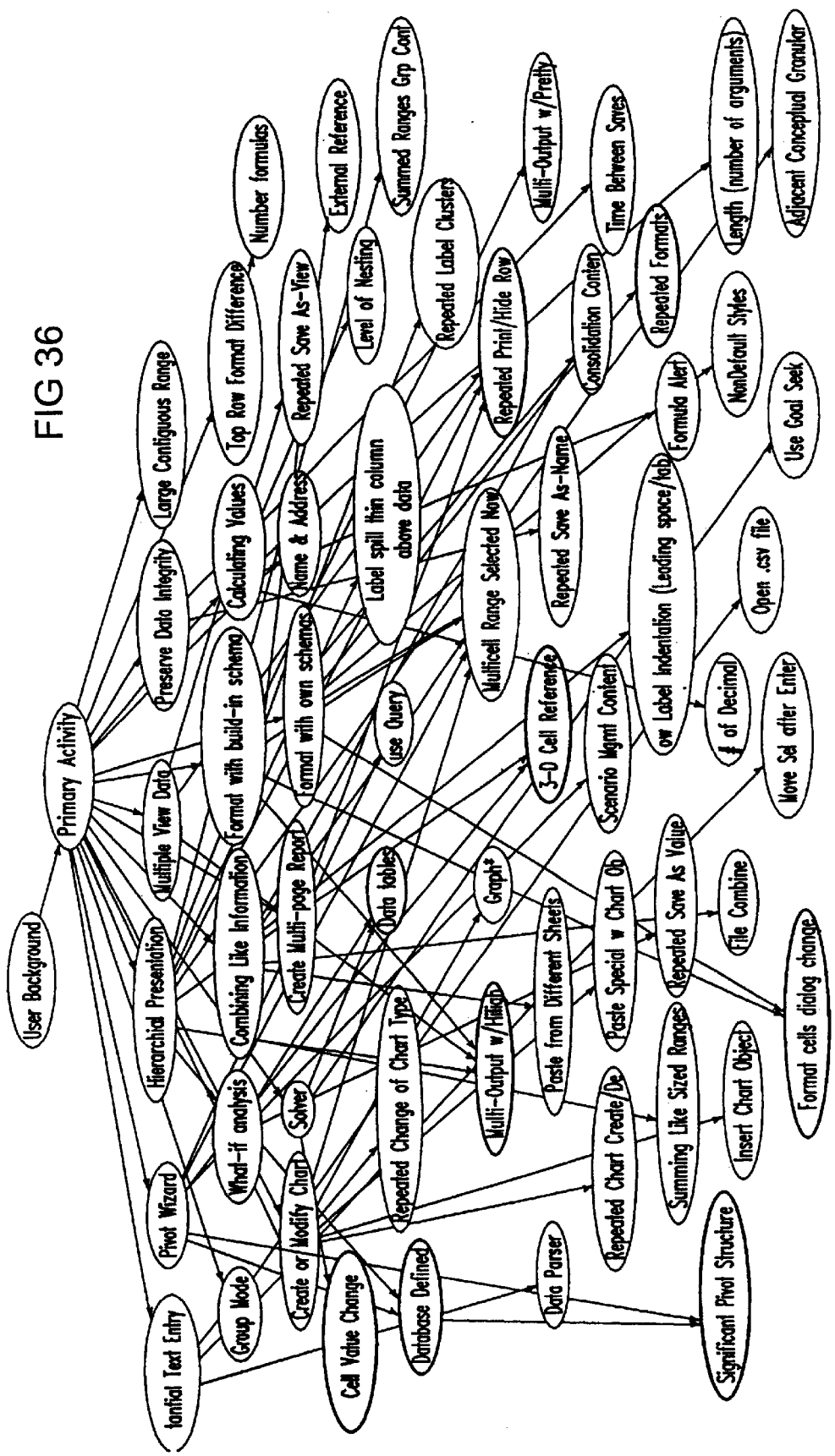
FIG. 36 is a diagram showing a Bayesian network of an example embodiment of the invention.

FIG. 25 shows an instantiation of the nodes with variables x and z with distinctions with relevance to reasoning about the relationship of actions and profile information on charting or graphing information from a spreadsheet, such as the MICROSOFT EXCEL spreadsheet product. Variables that are persistent and stored in a profile are marked with an adjacent P. Variables that are observed as modeled observable events are marked with M. One or more nodes may represent various classes of competency with charting. In this case, a single variable, User Competence Charting 220, is displayed as the variable that contains information about the overall level of charting ability of the user. The probability distribution over the states of this variable are influenced by Hx Help Charting 221 and Hx Activity Charting 222, and User Background 212. Hx Help Charting 221 is set by observations that are stored in persistent profile about one or more charting activities the user has completed successfully and information about the help information on charting in an online manual that the user has reviewed. Competencies about charting and a variety of other areas of software functionality influence the Primary Assistance Needed variable 213. This variable in turn influences the probability of observing different behaviors by the user. For example, the state of a user needing assistance on a specific type of charting task, influences the probability of seeing the user select and pause for s seconds on a chart in the document (Sel Chart Pause 223). FIG. 36 shows contains a more complete Bayesian network in an exemplary embodiment of a spreadsheet application.

Figure 26:
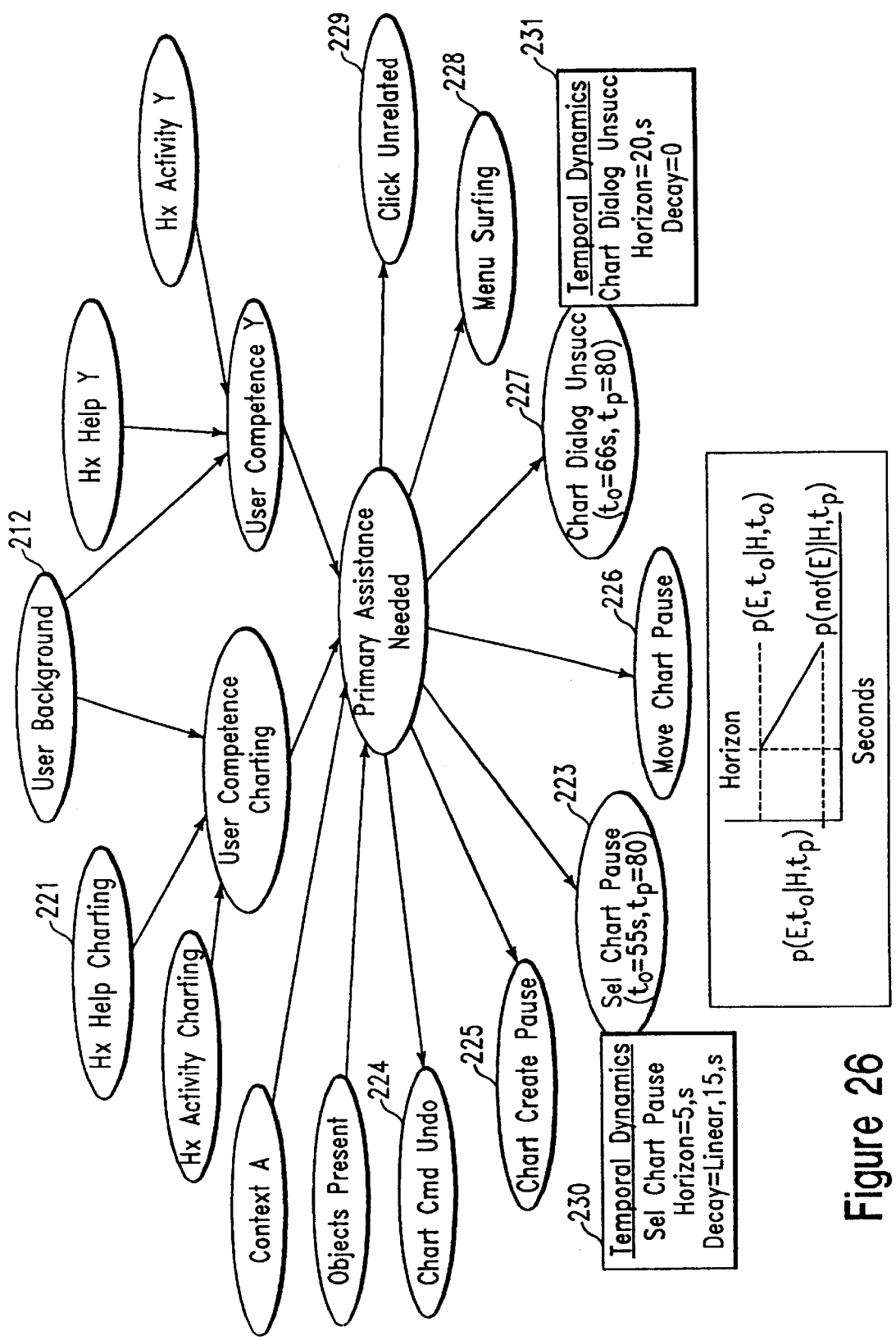
FIG. 26 is a Bayesian network annotated with temporal dynamics information made in accordance with the principles of the present invention in an exemplary embodiment of a spreadsheet application.

FIG. 26 represents an exemplary embodiment of temporal knowledge and inference. Each observable modeled event is annotated with information about the effects of time flow on the probabilistic relationships of the event with other variables in the Bayesian network. In this case, each node is annotated with temporal dynamics information about a horizon and decay, which may be implemented as a table of probabilities or other data structure. The dimensions of time for the temporal dynamics of each variable are indicated in seconds that have occurred since the event became true.

We now provide an example of a case based on components in the knowledge base displayed in FIG. 26.

Let us consider a case where we have the following profile information:
User_Background 212: Consumer_Novice
HX_Help_Charting 221: No_Help_Reviewed
Context: Normal_View
Objects:Sheet(1),Chart(2)
At time t=50 seconds, we have noted the following modeled events:
Chart_Cmd_Undo 224: Absent
Chart_Create_Pause 225: Absent
Sel_Chart_Pause 223: Absent
Move_Chart_Pause 226: Absent
Chart_Dialog_UnSucc 227: Absent
Menu_Surfing 228: Absent
Click_Unrelated 229: Absent Sel_Chart_Pause 223
$p(E_1, t_o|H_j, t_o)=0.15$
$p(not(E_1)|H_j, t_o)=0.85$
$p(E_1, t_o|not(H_j), t_o)=0.005$
$p(not(E_1), t_o|not(H_j), t_o)=0.995$
Horizon: 5 seconds
Dynamics:
$p(E_1, t_o|H_j, t_o)$: linear convergence at 15 seconds
$p(E_1, t_o|not(H_j), t_o)$: linear convergence at 15 seconds
Chart_Dialog_Unsucc 227
$p(E_2, t_o|H_j, t_o)=0.08$
$p(not(E_2)|H_j, t_o)=0.92$
$p(E_2, t_o|not(H_j), t_o)=0.0005$
$p(not(E_2), t_o|not(H_j), t_o)=0.9995$
Horizon 20 seconds
Dynamics: 0

A cycle of analysis is initiated at t=50 seconds. The cycle includes the composition of modeled events from atomic events local storage 102, the transmitting of the events to the Inference System 76, and inference with the new observations. We will explore the current probability that the primary assistance needed by the user is help with charting information, p(Charting_Assistance|E). The prior probability of the user needed help in this area conditioned on the user background, competence, and history of reviewing help is 0.001. The context information has increased this to a probability of 0.04. Probabilities are also assigned to other hypotheses about the primary assistance as a function of all of the evidence seen so far (but that is not explicit in this example).

At t=52 seconds the user selects a chart. The atomic event of chart being selected is detected and is stored in the atomic event local storage 102. The user then pauses for 3 seconds without doing anything. A dwell of 3 seconds is detected in the event local storage 102. A cycle of analysis is called at t=60 seconds. A modeled event Sel_Chart_Pause 223 is composed by the Event Processor 74, tagged as becoming true at t=55 seconds, and is sent to the Inference System 76.

The Inference System accesses the Bayesian network that is annotated with temporal dynamics information. As indicated in the table of probabilities for Sel_Chart_Pause 230, there is a horizon of 5 seconds, and a linear convergence of probabilities to the probabilities of absent at 15 seconds.

At t=63 seconds, the user selects a chart dialog and cancels the dialog with out success at t=66 seconds. A cycle of analysis is called at 70 seconds, and the modeled event Chart_Dialog_Unsucc 227 is composed and passed to the Inference System 76 with a time stamp of 66 seconds. As indicated in the table of probabilities for Chart_Dialog_Unsucc 231, there is a horizon of 20 seconds, and no temporal dynamics.

This user has set the threshold for being bothered with automated assistance at p=0.12. Thus, the user is offered assistance on charting when the probability that this topic is relevant rises to p=0.14.

At t=50 seconds
$p(Sel\_Chart\_Pause, t_o|H_j, t_p)=0.15$
$p(Sel\_Chart\_Pause, t_o|not(H_j), t_p)=0.005$
$p(not(Sel\_Chart\_Pause)|H_j, t_p)=0.85$
$p(not(Sel\_Chart\_Pause)|not(H_j), t_p)=0.995$
$p(Chart\_Dialog\_Unsucc, t_o|H_j, t_p)=0.08$
$p(Chart\_Dialog\_Unsucc, t_o|not(H_j), t_p)=0.0005$
$p(not(Chart\_Dialog\_Unsucc)|not(H_j), t_p)=0.9995$
$p(not(Chart\_Dialog\_Unsucc)|H_j, t_p)=0.92$
Inference result: $p(Charting\_Assistance|E, t_p)=0.02$
At t=60 seconds
$p(Sel\_Chart\_Pause, t_o|H_j, t_p)=0.15$ p(Sel_Chart_Pause, $t_o$|not($H_j$), $t_p$)=0.005
p(not(Sel_Chart_Pause)|$H_j$, $t_p$)=0.85
p(not(Sel_Chart_Pause)|not($H_j$), $t_p$)=0.995
p(Chart_Dialog_Unsucc, $t_o$|$H_j$, $t_p$)=0.08
p(Chart_Dialog_Unsucc, $t_o$|not($H_j$), $t_p$)=0.0005
p(not(Chart_Dialog_Unsucc)|not($H_j$), $t_p$)=0.9995
p(not(Chart_Dialog_Unsucc)|$H_j$, $t_p$)=0.92
Inference result: p(Charting_Assistance|E, $t_p$)=0.07
At t=70 seconds
p(Sel_Chart_Pause, $t_o$|$H_j$, $t_p$)=0.15 -->0.46
p(Sel_Chart_Pause, $t_o$|not($H_j$), $t_p$)=0.005 -->0.66
p(not(Sel_Chart_Pause)|not($H_j$), $t_p$)=0.995
p(not(Sel_Chart_Pause)|$H_j$, $t_p$)=0.85
p(Chart_Dialog_Unsucc, $t_o$|$H_j$, $t_p$)=0.08
p(Chart_Dialog_Unsucc, $t_o$|not($H_j$), $t_p$)=0.0005
p(not(Chart_Dialog_Unsucc)|not($H_j$), $t_p$)=0.9995
p(not(Chart_Dialog Unsucc)|$H_j$, $t_p$)=0.92
Inference result: p(Charting_Assistance|E, $t_p$)0.04
At t=80 seconds
p(Sel_Chart_Pause, $t_o$|$H_j$, $t_p$)=0.15 -->0.46 -->0.85
p(Sel_Chart_Pause, $t_o$|not($H_j$), $t_p$)=0.005 -->0.66 -->0.995
p(not(Sel_Chart_Pause)|not($H_j$), $t_p$)=0.995
p(not(Sel_Chart_Pause)|$H_j$, $t_p$)=0.85
p(Chart_Dialog_Unsucc, $t_o$|$H_j$, $t_p$)=0.08
p(Chart_Dialog_Unsucc, $t_o$|not($H_j$), $t_p$)=0.0005
p(not(Chart_Dialog_Unsucc)|not($H_j$), $t_p$)=0.9995
p(not(Chart_Dialog_Unsucc)|$H_j$, $t_p$)=0.92
Inference result: p(Charting_Assistance|E, $t_p$)=0.13
At t=90 seconds
p(Sel_Chart_Pause, $t_o$|$H_j$, $t_p$)=0.85
p(Sel_Chart_Pause, $t_o$|not($H_j$), $t_p$)=0.995
p(not(Sel_Chart_Pause)|not($H_j$), $t_p$)=0.995
p(not(Sel_Chart_Pause)|$H_j$, $t_p$)=0.85
p(Chart_Dialog_Unsucc, $t_o$|$H_j$, $t_p$)=0.08
p(Chart_Dialog_Unsucc, $t_o$|not($H_j$), $t_p$)=0.0005
p(not(Chart_Dialog_Unsucc)|not($H_j$), $t_p$)=0.9995
p(not(Chart_Dialog_Unsucc)|$H_j$, $t_p$)=0.92
Inference result: p(Charting_Assistance|E, $t_p$)=0.04

System Level IUAF for Multiple Applications

The methods described can not only be applied to individual applications, they can also be employed at the operating system level to reason about providing assistance in a system with multiple applications. In an exemplary embodiment to provide system assistance, a Bayesian network is used to assist a user with exiting an application by guessing when the user has completed or will soon be completing a task.

Figure 27:
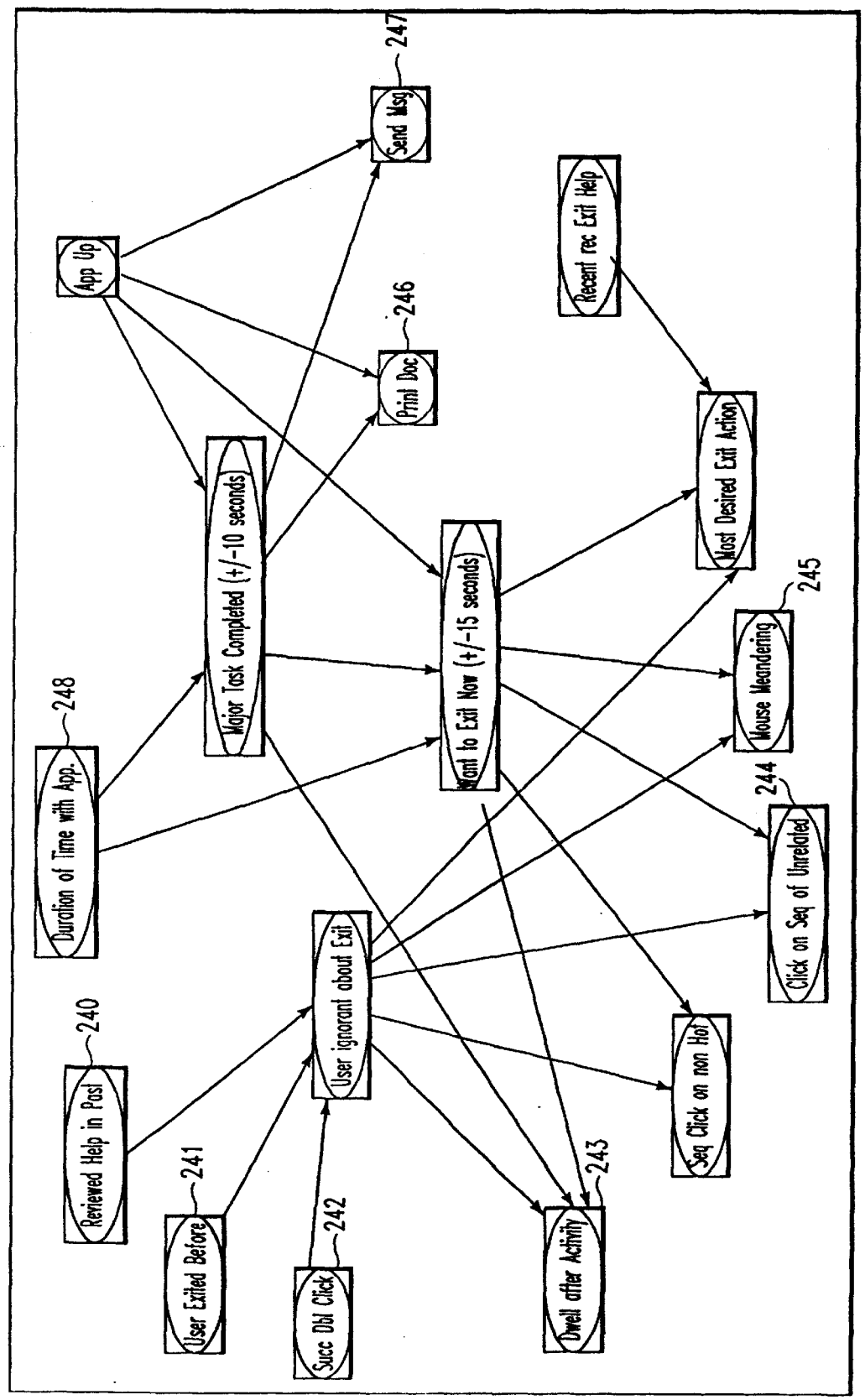
FIG. 27 is a portion of a Bayesian network illustrating a model in accordance with the principles of the present invention for assisting with exiting in a multiple application setting.

A Bayesian network knowledge base for assisting a user with this task is displayed in FIG. 27. Profile information including whether or not the user has reviewed help in past (Reviewed_Help_in_Past 240), has exited before (User_Exited_Before 241), and has demonstrated that they can perform a double-click operation (Successful_Double_Click 242) are included. Modeled events represented as observations in the Bayesian network include dwell after activity (Dwell after Activity243), sequence of clicks on a sequence of unrelated graphical icons (Click on Seq of Unrelated 244), mouse meandering (Mouse Meandering 245), whether a document has been recently printed (Print Doc 246) or a message has been sent (Send Msg 247), and the duration of time an application has been up (Duration of Time with App 248). A variable represents a probability distribution over the most desired action, allowing us to use probabilistic inference to reason about the likelihood of alternative best actions.

Figure 28:
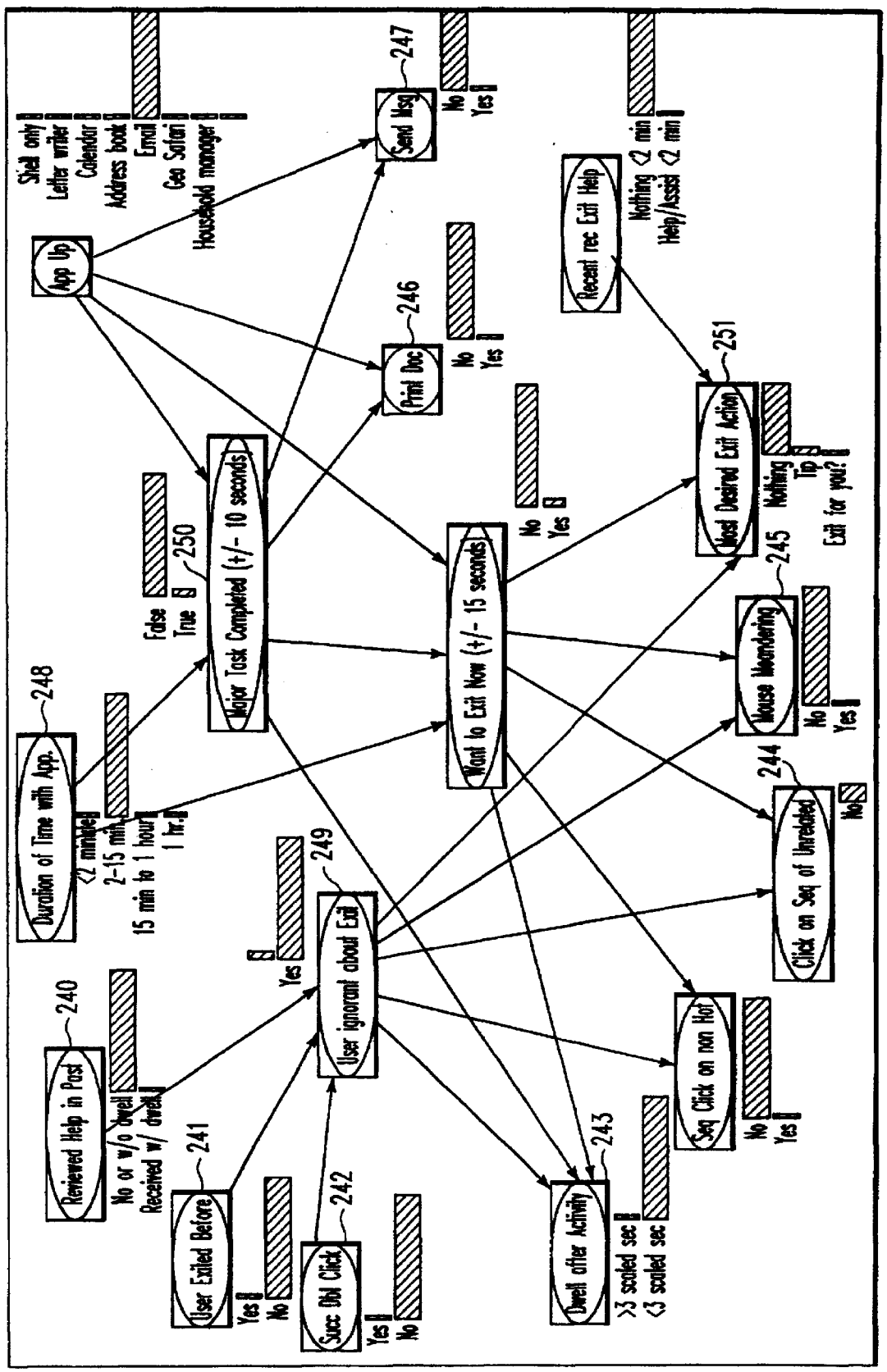
FIGS. 28–30 is a portion of a Bayesian network illustrating reasoning for assisting with exiting in a multiple application setting.

The sample scenario, demonstrates the results of the effect of monitored events on inference about the user. The sample case assumes the following profile: the user has not exited before on his/her own, the user has not demonstrated a successful double-click action, the user reviewed help about exiting applications but did not dwell on the information. The system now detects that the user has been in email for almost 10 minutes, and that the user has clicked on an unrelated sequence of graphical icons. FIG. 28 displays the states of each random variable, and shows, by the length of bars next to the states, the probability over different states of each random variable. As demonstrated by the bar graph, the Inference System 76 has computed that there is a high probability the user is ignorant about exiting (User Ignorant about Exit 249) and a low probability that the user has or will shortly complete a major task (Major Task Completed 250).

Figure 29:
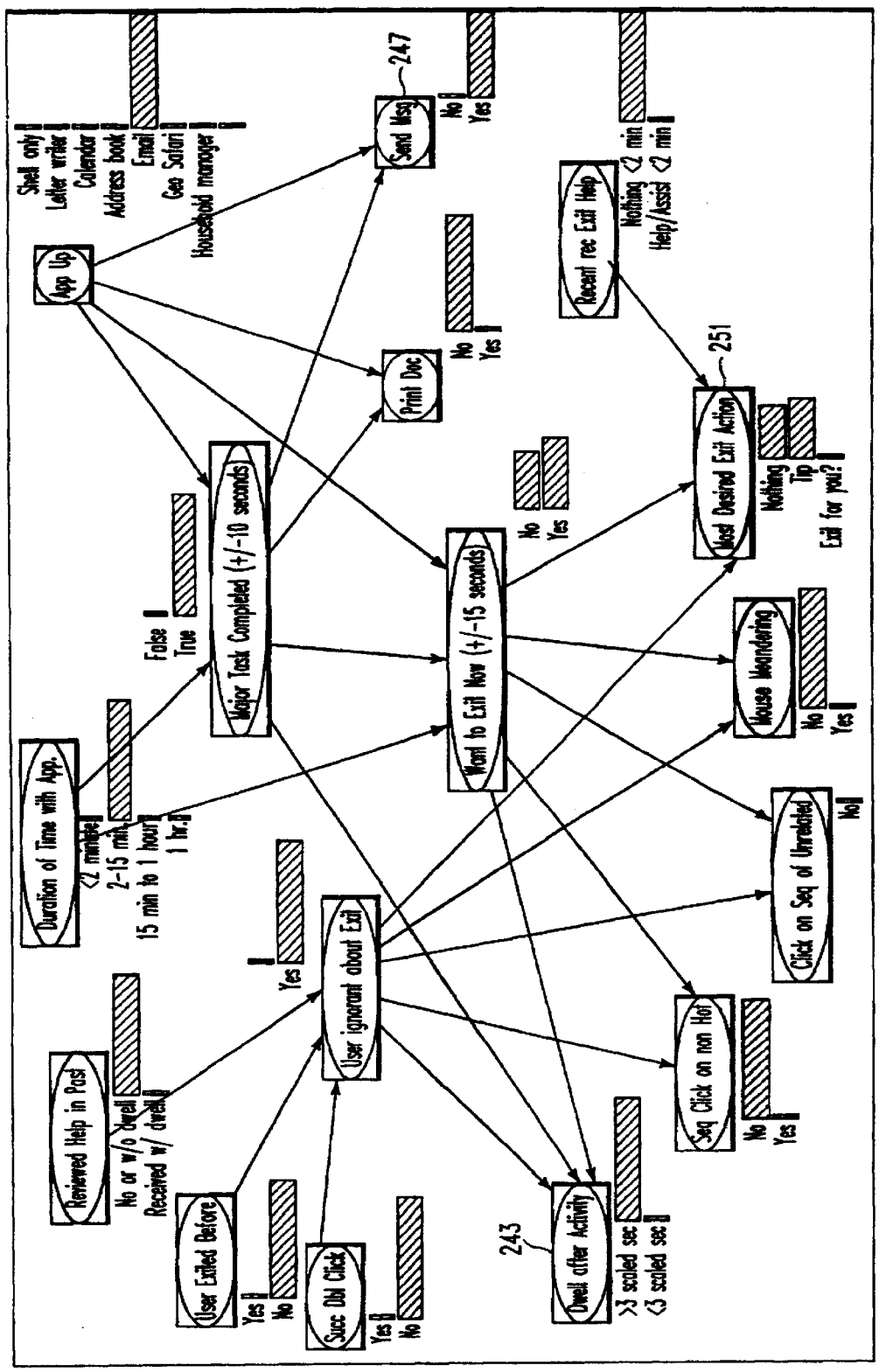
Figure 30:
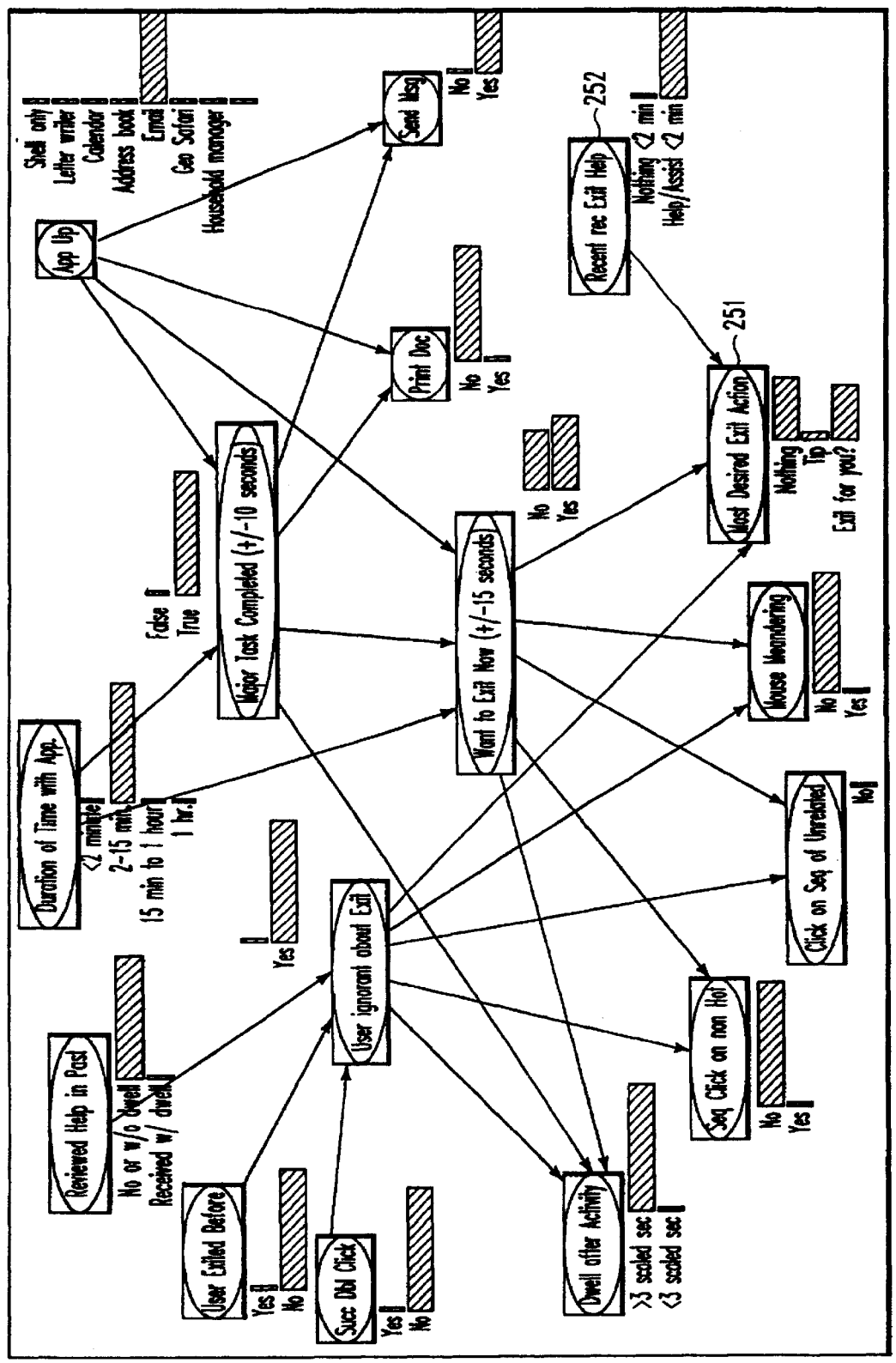

In FIG. 29, we see the results of inference after new modeled events are considered. In this case, the user has sent email (Send Msg 247) and has now dwelled for more than three scaled seconds after activity (Dwell after Activity 243). Providing a tip to the user is now identified as the most desired exit-related action (Most Desired Exit Action 251). FIG. 30 shows the same scenario with one change: the user has received help or assistance within the last two minutes (Recent rec Exit Help 252). Now the most likely desired action is to do nothing, followed by asking the user if the system should exit the application for them (Most Desired Exit Action 251).

IUAF Controller

Figure 31:
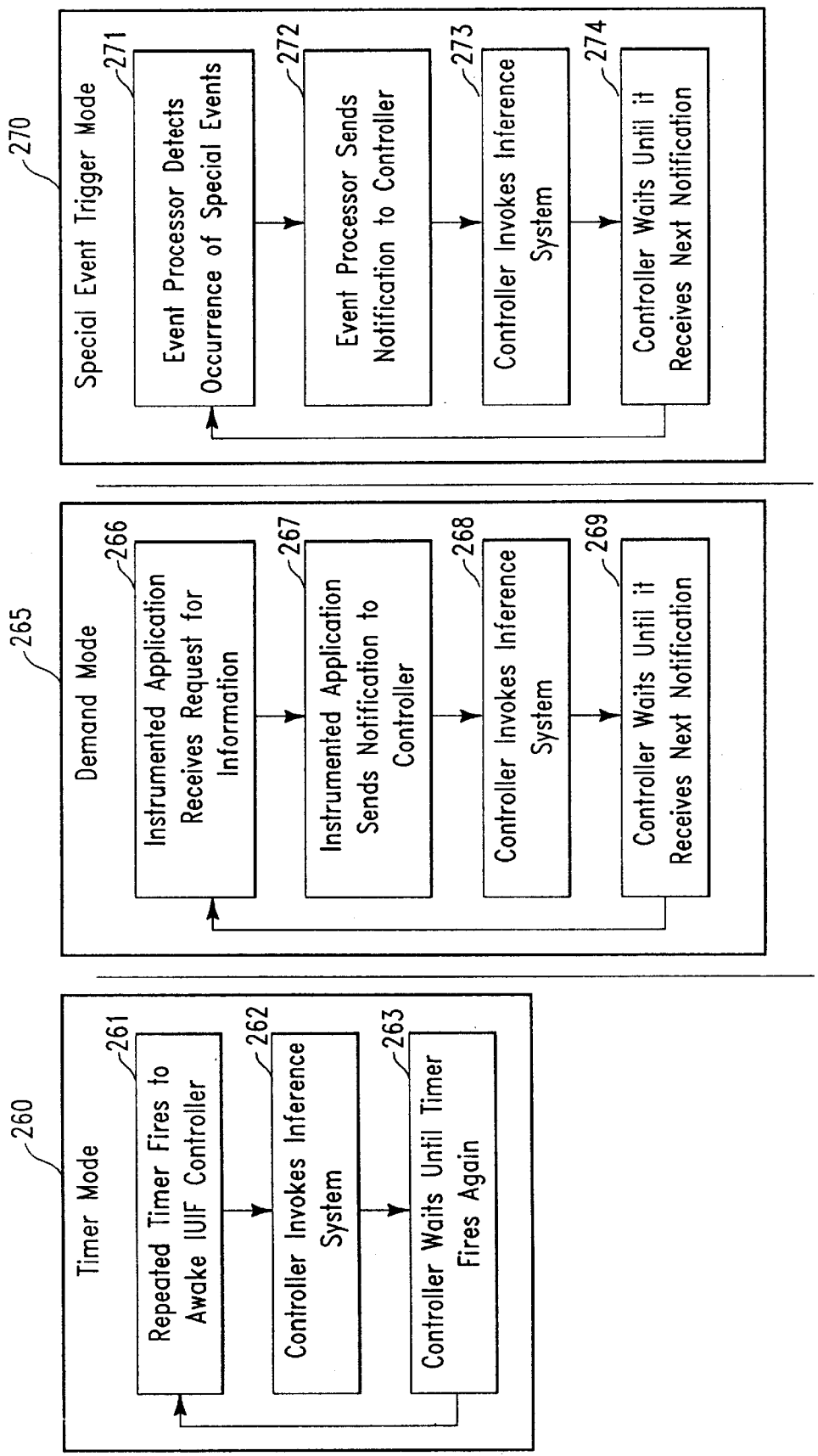
FIG. 31 is a diagram illustrating the control modes of the IUAF Controller.

There is typically a need for the overall control of various components of the Intelligent User Assistance Facility. Controls are needed for making decisions about the policy for calling the Event Processor 74 and Inference System 76, and for determining when assistance should be provided autonomously. FIG. 31 is a diagram illustrating various overall coordinative control modes of the Intelligent User Interface controller that may be used separately or together in combination. The first coordinative control mode illustrated is the timer mode 260 in which a repeated system timer fires to notify the IUAF controller to begin another cycle of monitoring and inference analysis (step 261). The IUAF controller then invokes the inference system (step 262). Upon completion of the inference analysis, the controller waits until the timer fires again (step 263). The timer mode can be extended to consider other constraints before allowing a cycle to begin. For example, in cases where complex inference occurs during event monitoring and inference, the additional condition of assessing the availability of computational resources (e.g., identifying whether there is idle time) can be added. Thus, the cycle of event processing and inference will occur when a timer fires and when there is also a condition of computational resource availability.

The second mode illustrated is the demand mode 265. This mode only performs inference analysis when the user asks for assistance. When an instrumented application receives a query for help information (step 266), the instrumented application sends notification to the IUAF controller (step 267). As a result of receiving the notification, the IUAF controller then invokes the inference system (step 268). Upon completion of the inference analysis, the controller waits until it receives the next notification (step 269).

The third mode illustrated is the special event trigger mode 270. In this mode, there is a list of special events that trigger a cycle of inference analysis. Whenever the event processor detects an occurrence of one of the special events (step 271), the event processor sends notification to the IUAF controller (step 272). Again, the IUAF controller then invokes the inference system as a result of receiving the notification (step 273). Upon completion of the inference analysis, the controller waits until it receives the next notification (step 274).

Any two or all three modes may be active at the same time. In the case when all three modes are active, if the user has not asked for assistance and has not initiated any user actions that translate into one of the special events during the period of the timer, then a cycle of inference analysis would occur when the period of the timer expired. Otherwise, the cycle of inference analysis would occur during the period of the timer when the user asked for assistance or initiated a user action that translated into one of the special events.

Integration of Analysis of Free-Text Query with Events

As mentioned earlier we can treat words in a user's free-text query for assistance as sources of modeled events. One embodiment makes use of a probabilistic model relating words in free-text query to the probability of relevant help topics. This has been described in U.S. patent application Ser. No. 08/400,797, and is incorporated hereby by reference in its entirety. In one exemplary embodiment, words and actions can be handled together in a uniform way as modeled events in a system that reasons about the probabilistic relevance of words and actions.

Figure 32:
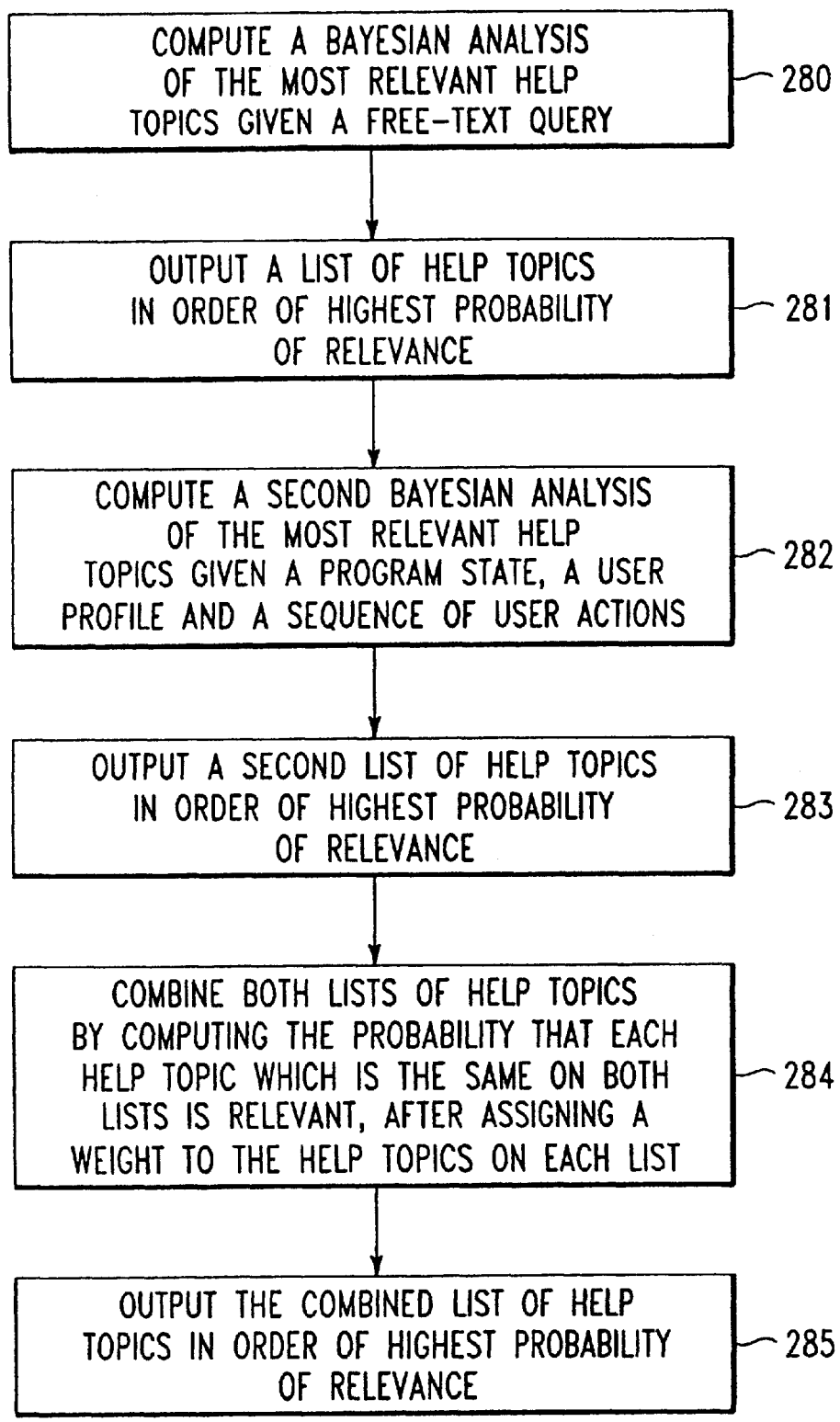
FIG. 32 is a method according to the present invention for combining inference analysis of user actions and program state with inference analysis of free-text query.

In an alternate embodiment, there are separate subsystems for handling words and for handling actions. The analyses of these separate subsystems are combined after separate probabilistic analyses are completed. FIG. 32 is a flowchart of the method for combining separate probabilistic analyses. First a Bayesian analysis of the most relevant help topics is computed for the given free-text query (step 280). This may be done following the methods described in U.S. patent application Ser. No. 08/400,797. The next step is to output a list of help topics in rank order by the highest probability of relevance (step 281). Then a second Bayesian analysis of the most relevant help topics is computed for the given program state, user profile and sequence of user actions (step 282). The next step is to output a second list of help topics in rank order by the highest probability of relevance (step 283). Then both of these lists of help topics are combined, after assigning a weight to the help topics on each list, by computing the probability that each help topic which is the same on both lists is relevant (step 284). The final step is to output the combined list of help topics in order of highest probability of relevance (step 285). In this embodiment, the performance of the system can be tuned by weighting the results of one set of events more heavily than the other by changing the value of a real-numbered parameter that is used to multiply the likelihoods assigned to the probabilities of hypotheses of interest (e.g., relevance of help topics) provided by the word or action analyses.

Building separate systems for analyzing the handling of words in a free-text query and user actions allows the two subsystems to be separately optimized based on specific properties of each class of events. The same can apply to other sets of actions, such as vision and speech events in systems with event monitoring that is extended with these additional sensory modalities.

Separate analyses also allow for the ease of implementing specific policies on combining the results, separating them, or sequencing them. For example, an embodiment might display an initial guess of assistance based on inference based on monitored actions, but when words are added, rely solely on the analysis based on the words, given the performance of a word analysis systems versus an action system. An alternative approach is to have control rules about the combination versus separation of the inference in different subsystems based on a comparative analysis of the results of the words and actions analysis.

Control of Communicating and Performing Assistance

Beyond coordinative control functions, the IUAF controller also makes decisions about when to bother the user with autonomous assistance or with queries for information about the user's goals (based on value of information computations). In an exemplary embodiment, a special Bayesian network, or component of a network, resident in the Inference system 76 computes the overall probability that a user would like assistance at the current time. The IUAF controller uses this changing probability to control when autonomous help is provided. The IUAF provides autonomous help whenever the computed probability that a user would like assistance at that time exceeds a threshold which may be changed by the user. A users changes the threshold for offering autonomous assistance using a threshold controller. The threshold controller, for example, may be in the form of a sliding threshold control can be displayed to users on an autonomous help window, allowing them to change the threshold depending on the value they find in receiving help versus the distraction it causes. A screen shot of a dynamic assistance window with a threshold slider is displayed in FIG. 22.

Figure 33:
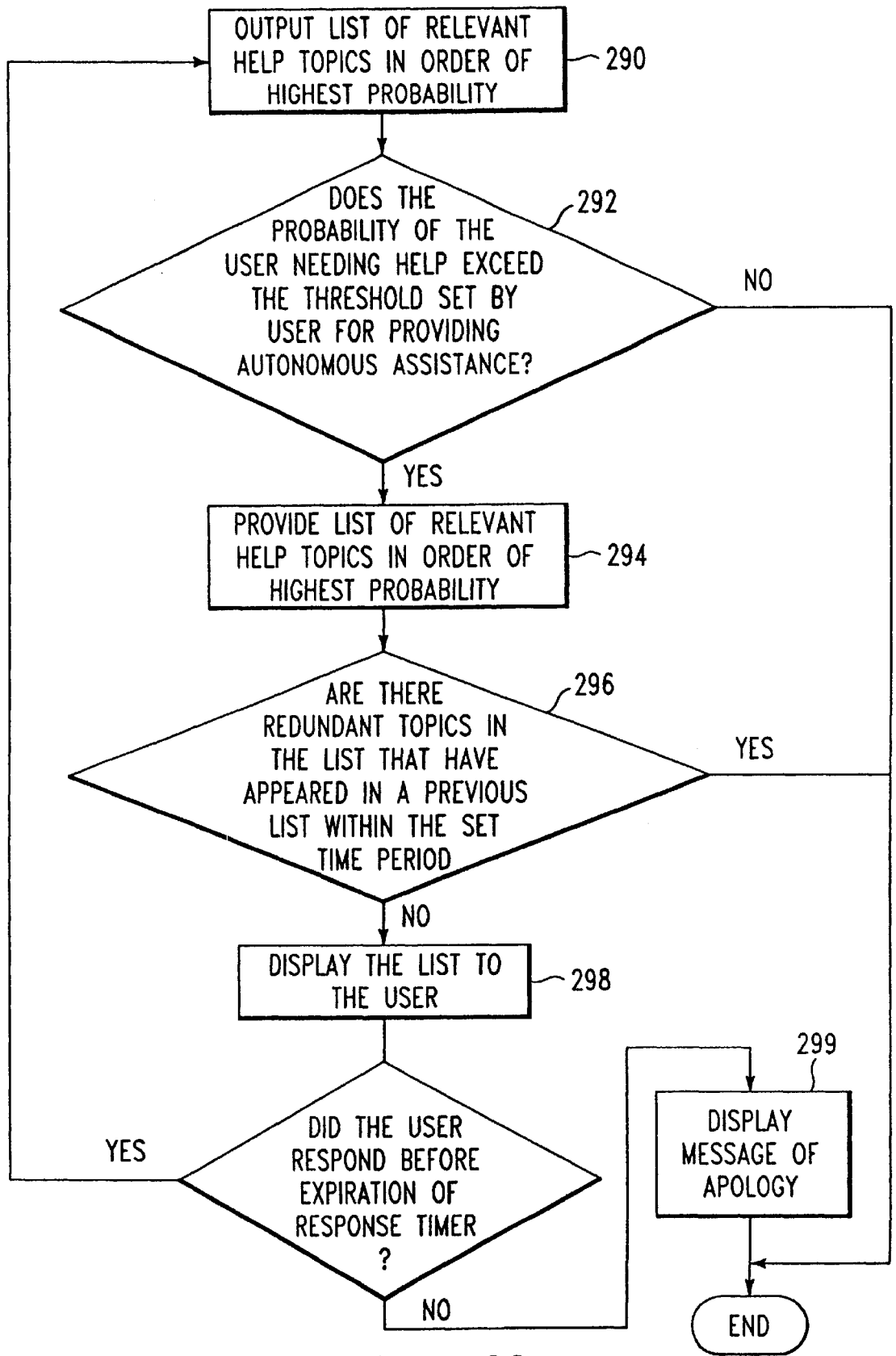
FIG. 33 is a flowchart of the autonomous assistance procedure of the present invention.

FIG. 33 is a flowchart of the method of providing autonomous assistance in this embodiment. During a cycle of inference analysis, the inference system 76 outputs a list of relevant help topics in order of highest probability of relevance (step 290). This may be done as described previously in the discussion of the inference system. The next step is to determine whether the probability of the user needing help exceeds the threshold set by the user for providing autonomous assistance (step 292). If the probability of the user needing help exceeds the threshold set by the user, then the inference system 76 provides a list of relevant help topics in the order of highest probability (step 294). The list may be truncated so as to only show the most likely or several most likely topics, but within a window that allows the user to scroll through a longer list if desired. Next, the list of relevant topics are checked for redundant help topics that have appeared in the previous list within a specified time period (step 296). If there are no redundant help topics, the list is displayed to the user (step 298). If the user responds to the autonomous offer of help, then steps 290 through 298 are repeated until the user fails to respond before expiration of the response timer. If the user fails to respond before the expiration of the response timer, then a message of apology is displayed on the title of the window (step 299) and the window is subsequently removed.

Those skilled in the art will recognize that alternate embodiments may be used such as only offering autonomous assistance when directly requested by the user, e.g. by clicking on a graphical icon associated with the intelligent assistance facility. The system can also use computed measures of expected utility or its approximation for offering autonomous assistance. Furthermore, the system could only offer autonomous assistance when the sum of the individual probabilities of the relevance of each topic in the set of topics that will be offered to provide assistance exceeds some constant value.

In an exemplary embodiment, guesses on help topics are not presented when a user requests assistance, unless the probability computed for the top five topics together do not sum to at least 0.40. In yet another alternate embodiment, autonomous assistance will not be offered unless the user is pausing, so as to not distract the user while the user is engaged in activity unless it is deemed important to assist the user with that activity while the activity is in progress.

Figure 34:
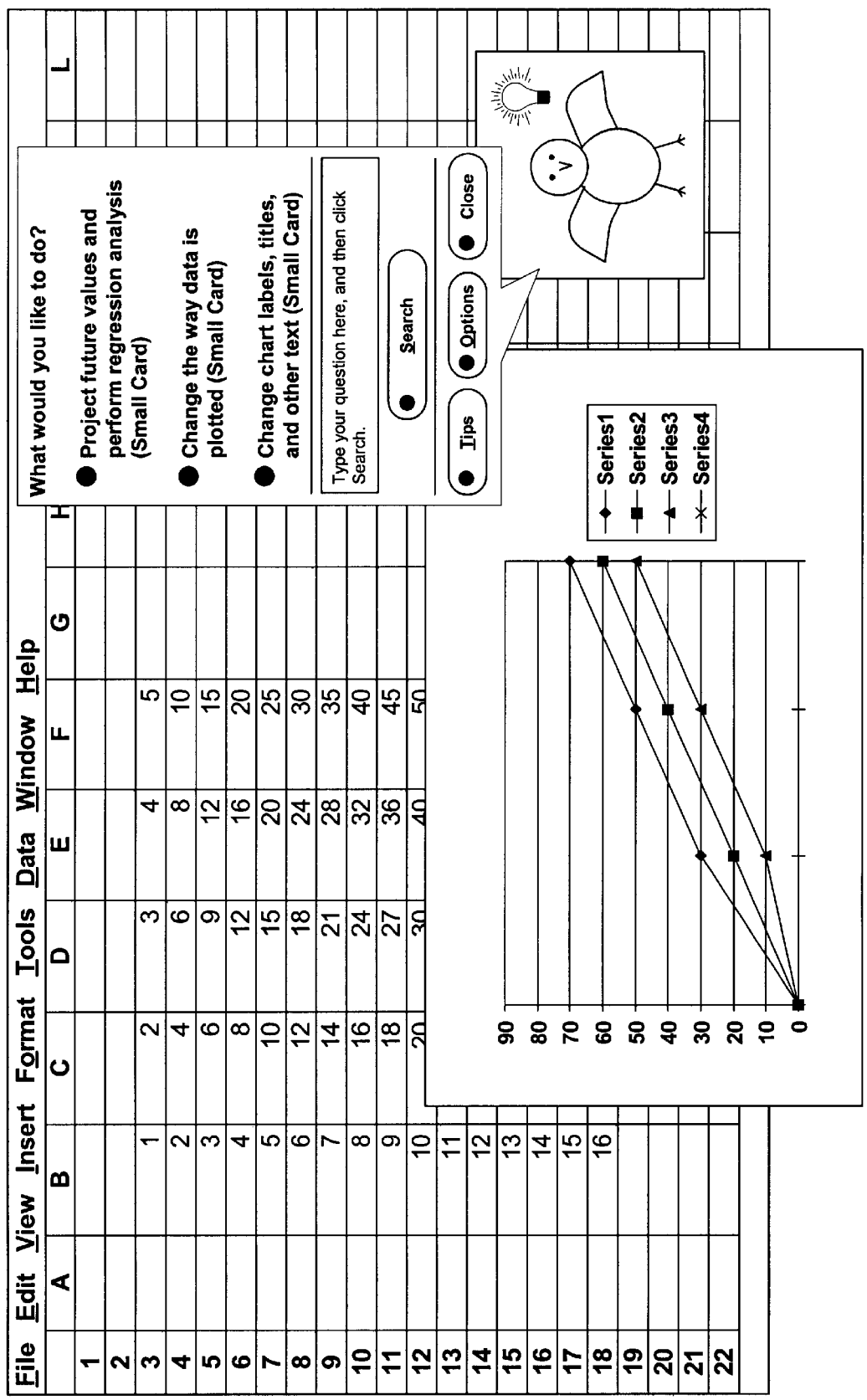
FIG. 34 is an illustration of a social interface providing intelligent user assistance for a spreadsheet program.
Figure 35:
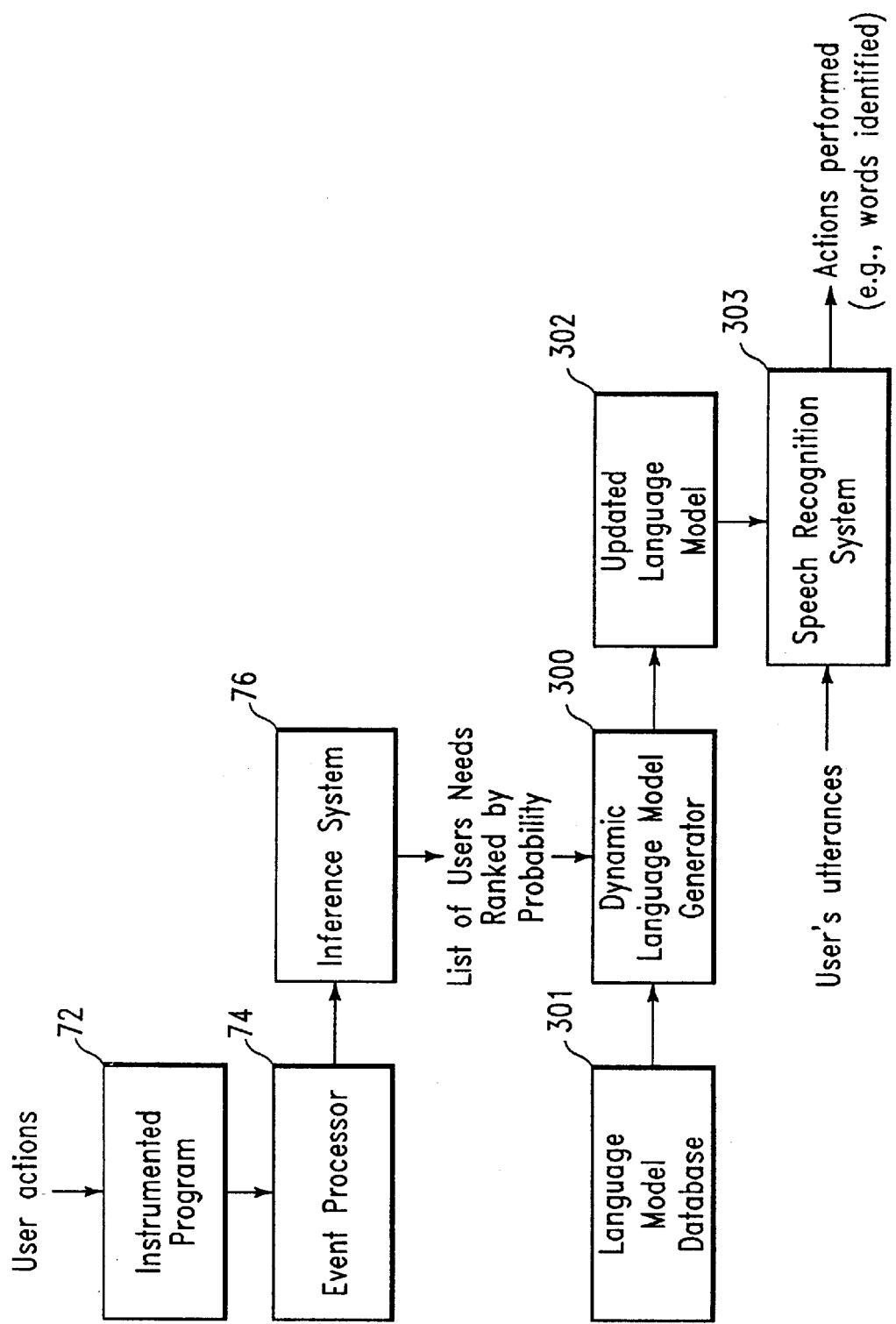
FIG. 35 is a block diagram of the IUAF with speech recognition system showing use of inference results to enhance speech recognition.

It can also be useful to provide social conventions and metaphors. For example, the results of inference can be used to control the behavioral gestures of a graphical social cartoon character. An example of this kind of interface is displayed in FIG. 34. IUAF inference results about likely problems the user is having or potentially valuable assistance might be alternately be displayed in a "thought cloud" metaphor over a character's head. Free-text queries can be typed into a graphical text input box that appears to be a means for a character to see or listen to the query.

Speech Recognition Enhancement via Integration with IUAF Components

Figure 12:
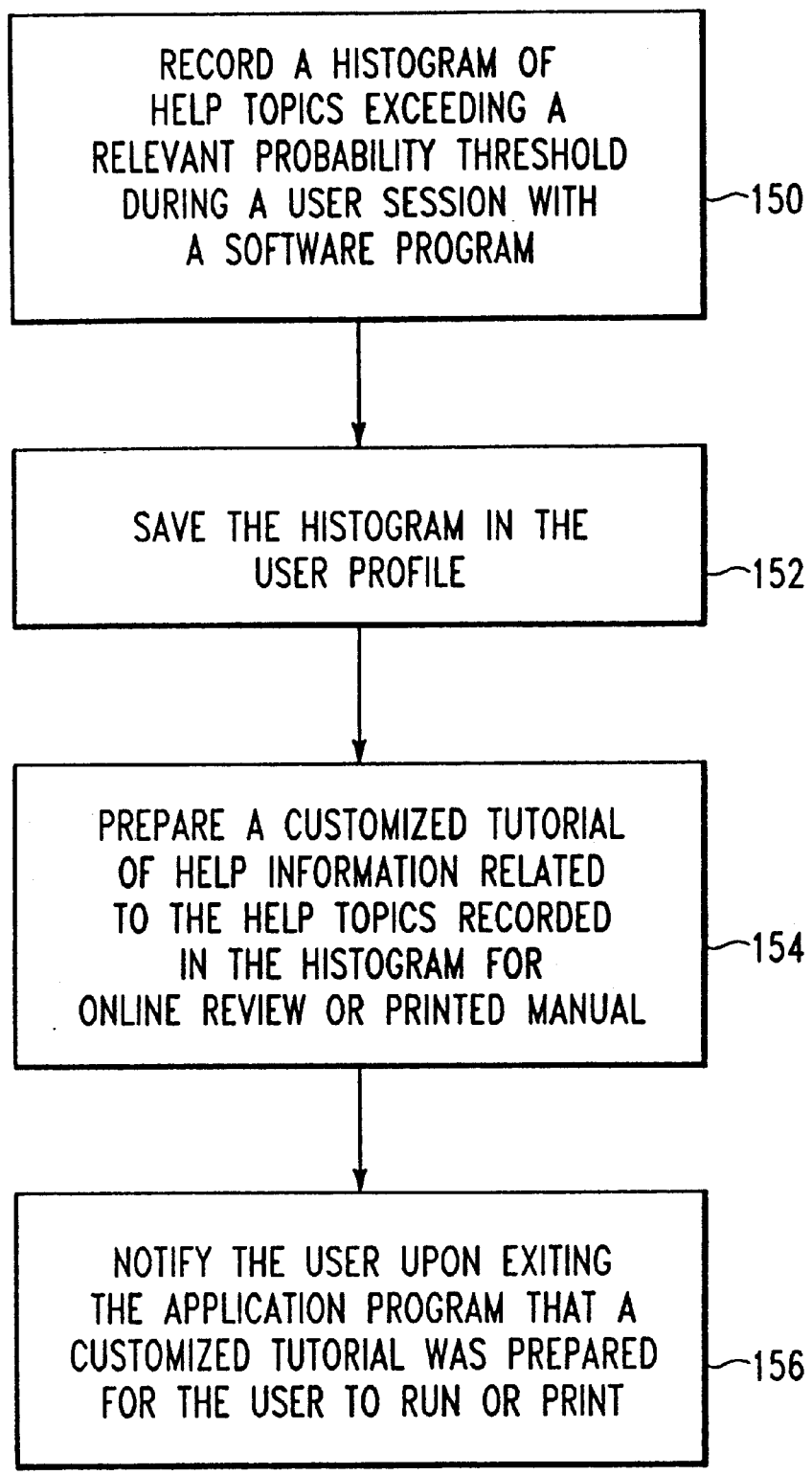
FIG. 12 is a flowchart of the Customized Tutorial Routine of the User Profile System of FIG. 9.

Those skilled in the art of speech recognition will appreciate the power that could be gained if the speech language models used to characterize phonemes by probability were dynamically influenced by information computed about the goals, intentions, or needs of computer users. As portrayed in the influence diagram in FIG. 12, user background and goals influence the actions seen in an interface, the words used in free text query, and the speech utterances generated by users in attempting to communicate with a software system or application. Understanding the likelihood of goals and intentions of users in making utterances can enhance our ability to perform automated speech recognition. Such systems will allow us to adjust the probabilities over utterances, and thus, the likelihood of words, and phonemes being uttered by users of computer software.

Speech recognition involves processing the audio signal generated by an utterance into likely phonemes, and the processing of phonemes into likely words. Probabilistic systems for speech recognition may compute the likelihood of phonemes given the audio signal and the likelihood of alternate words given the signal. The term speech is used to refer to the evidence provided by the steps of processing an utterance into audio signals or into phonemes.

Bayesian speech understanding systems compute the probability of word or stream of word from an utterance as follows:

$$p(\text{words} \mid \text{speech}) = \frac{p(\text{words}) * p(\text{speech} \mid \text{words})}{p(\text{speech})}$$

By computing the probability over a user's needs or goals given user actions as represented by modeled events (including those based on gaze), we can refine the accuracy of the probability of words given a user speech as follows:

We can update the likelihood that words or word strings will be used in the context of goals by representing the likelihood that words or word strings will be used in the context of specific goals, and update the base probabilities that words will be used, p(words), contained in a typical language model in real-time. That is, instead of using a static database of p(words), we instead update the probability of words as follows:

$$p(\text{words}) = \Sigma_i p(\text{words} \mid \text{user needs}_i) * p(\text{user needs}_i)$$

This computation takes advantage of a knowledge base of context-specific language models that contain information of the form $p(\text{words}) = \Sigma_i p(\text{words} \mid \text{user needs}_i)$.

At run-time, actions are analyzed by the Event Monitoring System and are passed to the Inference System which provides dynamically the continually recomputed probability distribution over user needs, p(user needs|events) as described above. One exemplary application is the reasoning about help topics, and context specific language models contain information of the form p(words|relevant help topic).

In a more general statement showing the modification of the above equation for speech recognition, we input dynamic events p(words|speech, events)=

$$\left[ \sum_i p(\text{words} \mid \text{user needs}_i, \text{events}) * p(\text{user needs}_i \mid \text{events}) \right] * \frac{p(\text{speech} \mid \text{words})}{p(\text{speech})}$$

This can be reduced to:

$$p(\text{words} \mid \text{speech}, \text{events}) = \frac{p(\text{words} \mid \text{events}) * p(\text{speech} \mid \text{words})}{p(\text{speech})}$$

FIG. 23 displays the key components and flow of analysis employing key components of the intelligent user assistance facility to enhance speech recognition by dynamically changing the likelihoods over words, and thus, phonemes uttered. As displayed in the figure, user actions are tracked by an instrumented program 72, and atomic events are composed into modeled events by the Event Processor 74 and passed to the Inference System 76. The inference system computes a probability distribution of the needs of a user and the weighted list of needs are passed to a Dynamic Language Model Generator 300.

The Dynamic Language Model Generator 300 has a mapping between alternative needs and the likelihood of utterances or words. This component may contain information from a Language Model Database 301 that contains language models containing probabilistic information of the form, p(words|user need), the probabilities of different words or word strings being uttered by a user given the user needs. These language models can be constructed through training with statistics from a large corpus of strings of words that are recorded in different user-needs contexts. At run-time, the Inference System provides a probability distribution over user needs which is used to control the creation of an updated language model, based on weighting the language models from the different contexts. The updated language model 302 contains information of the form, p(words|events), created by weighting sets of words in terms of the likelihood of alternative needs based on the probabilistic inference results.

Overall, taking advantage of context in listening can enhance the accuracy of speech recognition system 303 by lowering the probability of utterances that are unlikely and raising the probability of utterances that are more likely, per the user modeling.

Beyond use with software in receiving assistance, the dynamic speech understanding has application in variety of speech understanding tasks. As one example, the methods have application in a variety of interfaces with command and control, referring to the manipulation of controls and functionality of software. If we model the goals of the user, we can generate grammars that are appropriately weighted to reflect the next steps of the user, and there are less prone to error.

These methods can be used in conjunction with models that generate the probability of the next software command given user goals. In this approach we focus on a particular user need, the desire for action. The user's desire for action may refer to the implementation of one or more software controls by speech, including the access of one or more help topics. We substitute p(desired action|events) for p(user needs|events) in the above equations, and employ language models that contain information p(words|desired action), instead of p(words|user needs). Events considered in this model can include context which may include information about the window that is active and the text, buttons, and controls that are displayed to the user while the speech utterance is occurring.

For example, dynamic language models for command and control have application in systems that explicitly generate and display probabilistic results as part of their functioning. Consider as an example, a probabilistic reasoning system that employs a Bayesian network or influence diagram for assisting a physician with diagnosis from a set of symptoms. Bayesian reasoning systems in medicine may have sets of windows containing the results of diagnostic inference. A window may list diseases by computed likelihoods, another may list the best next symptoms or tests to evaluate, based on value of information. By building or assessing a model of the probability of the user's actions given the context of displayed information, which may include functions of the computed probabilities and expected utilities assigned to displayed objects, we can compute and use a dynamically re-computed p(words events) in speech recognition.

While the present invention has been illustrated with reference to exemplary embodiments, those skilled in the art will appreciate that various changes in form and detail may be made without departing from the intended scope of the present invention as defined in the appended claims. For example, the general event composition and inference system may also be used in an operating system to provide an intelligent user shell and, more generally, to optimize the functionality of any computer system or software. Because of the variations that can be applied to the illustrated and described embodiments of the invention, the invention should be defined solely with reference to the appended claims.

What is claimed is:

1. An inference system for use in an intelligent user assistance facility system for a software program, the inference system comprising:

a knowledge base, the knowledge base storing information relating to at least variables that represent observable states regarding user-initiated actions within the software program, and to variables that represent hypotheses about goals and needs for assistance of the user relative to the software program; and an inference engine, the inference engine identifying help-oriented actions that a user can perform in the software program to render operation of the software program easier for the user, the help-oriented actions optimizing expected utility of the user within the software program given a cost of displaying the help-oriented actions without initiation by the user, and the goals and needs for assistance of the user relative to the software program as stored in the knowledge base, such that at least one of the help-oriented actions are displayed to the user by the intelligent user assistance facility system, and one or more of the at least one of the help-oriented actions displayed to the user are performed by the user within the software program.

2. The inference system of claim 1 wherein the knowledge base is a Bayesian network.

3. The inference system of claim 1 wherein the knowledge base is a set of logical rules.

4. The inference system of claim 1 wherein the inference engine is a Bayesian network.

5. The inference system of claim 1, wherein the inference engine includes a value-of-information component that determines a probability that a value of acquiring additional information from the user by the user assistance facility system is greater than a threshold value, based on a cost-benefit analysis performed under uncertainty.

6. A computer readable medium having computer executable components of claim 1.

7. An inference engine for use in an inference system in conjunction with an intelligent assistance facility system for a software program, the inference engine comprising:

a Bayesian network comprising nodes representing hypotheses about goals and needs for assistance of the user relative to the software program, and nodes representing observed evidence regarding user-initiated actions within the software program; and temporal reasoning approximation functionality associated with at least one of the observed evidence nodes, the functionality determining a probability of relevance as the probability changes with passage of time, and identifying help-oriented actions corresponding to the hypotheses nodes that a user can perform in the software program to render operation of the software program easier for the user, such that at least one of the help-oriented actions are displayed to the user by the intelligent user assistance facility system, and one or more of the at least one of the help-oriented actions displayed to the user are performed by the user within the software program.

8. The inference engine of claim 7, wherein the observed evidence are high-level modeled events modeled from the user-initiated actions within the software program according to event composition rules defined in an event specification.

9. A method for an inference system to autonomously acquire unobserved information from a user to assist in determining suggested user assistance, comprising:

ordering a list of a plurality of items of the unobserved information from highest to lowest value;

proceeding down the list by performing for a given item of the list:

determining a benefit of obtaining of the given item;

determining a cost of distracting the user to obtain the given item;

in response to the benefit exceeding the cost, submitting a request to the user to provide the given item;

until occurrence of one of: the user fails to respond to the request, and the cost exceeds the benefit.

10. A method for improving accuracy of a speech recognition system used in conjunction with an intelligent assistant facility system for a software program, the method comprising detecting user-initiated actions within the software; program, composing high-level modeled events from the user-initiated actions according to event composition rules defined in an event specification, employing probabilistic inference to determine a probability distribution of goals and needs for assistance of a user relative to the software program from the high-level modeled events, modifying probabilities of the words in a language model database that are recognized by the speech recognition system based on the probability distribution, detecting speech of the user, and recognizing the speech of the user as one or more of the words in the language model database, based on the probabilities of the words in the language model database as have been modified based on the probability distribution of the goals and needs for assistance of the user relative to the software program.

11. The method of claim 10, wherein the speech of the user as detected relates to user-spoken commands for the software program.

12. The method of claim 10, wherein the speech of the user as detected relates to user-spoken help queries regarding the software program.

13. A computer readable medium having computer executable instructions for performing the method of claim 10.

* * * * *